(12) United States Patent
Hyde et al.

(10) Patent No.: US 9,273,639 B2
(45) Date of Patent: Mar. 1, 2016

(54) SYSTEM AND METHOD FOR STORING AND DISPENSING FUEL AND BALLAST FLUID

(71) Applicant: ELWHA LLC, Bellevue, WA (US)

(72) Inventors: Roderick A. Hyde, Redmond, WA (US);
Jordin T. Kare, Seattle, WA (US);
Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 453 days.

(21) Appl. No.: 13/625,607

(22) Filed: Sep. 24, 2012

(65) Prior Publication Data

US 2014/0083522 A1    Mar. 27, 2014

(51) Int. Cl.
*F17C 13/08* (2006.01)
*F17C 3/08* (2006.01)
(Continued)

(52) U.S. Cl.
CPC ........... *F02M 21/06* (2013.01); *F02M 21/0209* (2013.01); *F02M 21/0221* (2013.01); *F17C 1/00* (2013.01); *F02D 19/0647* (2013.01); *F17C 2205/0367* (2013.01); *F17C 2221/011* (2013.01); *F17C 2221/014* (2013.01); *F17C 2221/031* (2013.01); *F17C 2221/033* (2013.01); *F17C 2223/0161* (2013.01); *F17C 2223/033* (2013.01); *F17C 2227/0341* (2013.01); *F17C 2260/031* (2013.01); *F17C 2265/065* (2013.01); *F17C 2265/066* (2013.01); *F17C 2270/0139* (2013.01); *F17C 2270/0168* (2013.01);
(Continued)

(58) Field of Classification Search
CPC .............. F17C 2221/033; F02M 21/0209; F02M 21/0221

USPC ................. 62/53.2, 45.1, 48.1, 7, 614, 616; 165/104.21; 137/334
See application file for complete search history.

(56) References Cited

U.S. PATENT DOCUMENTS 3,565,201 A * 2/1971 Petsinger .................... 180/69.5
3,878,689 A    4/1975 Grenci
(Continued)

FOREIGN PATENT DOCUMENTS

JP    1990-0226629 A    10/1990
WO   WO 2011/141286 A1   11/2011

OTHER PUBLICATIONS

PCT International Search Report; International App. No. PCT/US2013/059966; Dec. 6, 2013; pp. 1-3.

*Primary Examiner* — Allen Flanigan
*Assistant Examiner* — Filip Zec

(57) ABSTRACT

A system for storing and dispensing fuel and a ballast fluid is disclosed. The system may be employed in a vehicle or facility having a power plant. Fuel and ballast fluid may be stored cryogenically in a liquid phase and dispensed to the vapor phase. The system may employ a thermal and volumetric compensatory arrangement wherein fuel dispensed from storage for use in a power plant is used as a heat exchange medium (refrigerant) for ballast fluid received for storage; during refueling, ballast fluid stored in the vehicle or facility may be dispensed and used as a refrigerant for fuel being stored in the vehicle in space made available by the dispensed ballast fluid. The fuel may be natural gas with a main component of methane; the ballast fluid may be a fluid obtainable from ambient environmental air, such as nitrogen or oxygen. The fuel and ballast fluid may be conditioned so that the respective boiling points are approximately equal. The system may employ a heat transfer system with a microchannel heat exchanger.

47 Claims, 11 Drawing Sheets

(51) Int. Cl.
  *F17C 7/04* (2006.01)
  *F25J 1/00* (2006.01)
  *F28D 15/00* (2006.01)
  *F16K 49/00* (2006.01)
  *F16L 53/00* (2006.01)
  *F02M 21/06* (2006.01)
  *F17C 1/00* (2006.01)
  *F02M 21/02* (2006.01)
  *F02D 19/06* (2006.01)

(52) U.S. Cl.
  CPC ............... *Y02T 10/32* (2013.01); *Y02T 10/36* (2013.01); *Y10T 29/49716* (2015.01); *Y10T 137/6416* (2015.04)

(56) References Cited

U.S. PATENT DOCUMENTS

| | | | |
|---|---|---|---|
| 4,292,062 A * | 9/1981 | Dinulescu et al. | 62/7 |
| 4,315,407 A | 2/1982 | Creed et al. | |
| 4,359,118 A | 11/1982 | Latter et al. | |
| 5,231,838 A | 8/1993 | Cieslukowski | |
| 5,415,001 A | 5/1995 | Powars | |
| 5,505,232 A | 4/1996 | Barclay | |
| 5,551,256 A | 9/1996 | Schmidt | |
| 6,899,146 B2 | 5/2005 | Bingham et al. | |
| 6,986,490 B2 * | 1/2006 | Eihusen et al. | 248/312 |
| 7,000,427 B2 * | 2/2006 | Mathias et al. | 62/612 |
| 7,497,191 B2 * | 3/2009 | Fulton et al. | 123/3 |
| 7,568,352 B2 | 8/2009 | Grayson et al. | |
| 7,637,109 B2 * | 12/2009 | Marin et al. | 60/780 |
| 7,637,122 B2 | 12/2009 | Turner et al. | |
| 7,654,072 B2 | 2/2010 | Russo | |
| 2004/0205032 A1 | 10/2004 | Routtenberg et al. | |
| 2005/0246275 A1 | 11/2005 | Nelson | |
| 2007/0144183 A1 * | 6/2007 | Sakajo | 62/7 |
| 2009/0199576 A1 | 8/2009 | Ciccarelli | |
| 2010/0325049 A1 | 12/2010 | Tanaka | |
| 2011/0035049 A1 | 2/2011 | Barrett | |
| 2012/0078741 A1 | 3/2012 | DeLine | |
| 2012/0181483 A1 | 7/2012 | Simmons et al. | |
| 2012/0290473 A1 | 11/2012 | Ree et al. | |

* cited by examiner

SYSTEM AND METHOD FOR STORING AND DISPENSING FUEL AND BALLAST FLUID

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

United States patent application Ser. No. 13/625,715, entitled SYSTEM AND METHOD FOR STORING AND DISPENSING FUEL AND BALLAST FLUID, naming RODERICK A. HYDE, JORDIN T. KARE, and LOWELL L. WOOD, JR. as inventors, filed 24, Sep. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

FIELD

The present invention relates to a system and method for storing and dispensing fuel and ballast fluid. The present invention also relates to vehicle/transport comprising a system and method for storing and dispensing fuel and ballast fluid. The present invention further relates to a station/facility comprising a system and method for storing and dispensing fuel and ballast fluid.

BACKGROUND

It is well-known to provide fuel for a power plant for a vehicle or facility (e.g. to power an engine or generator). It is also well-known to provide a vehicle with an engine or power plant that uses a fuel such as gasoline (e.g. a passenger, commercial vehicle, etc.) or diesel fuel (e.g. a truck, bus, work vehicle, train, etc.). Fuel for the vehicle is stored in a tank or chamber in the vehicle and dispensed to the power plant as needed.

It is also known to use natural gas which is relatively abundant (at present) and widely available through an established distribution network as a fuel source for power plant (e.g. as a fuel for combustion). Natural gas has methane as its main component and exists as a gas (vapor) at ambient environmental conditions of temperature and pressure. Natural gas is readily available in the environment as a fossil fuel and/or can be produced from decomposing/landfill waste or at other man-made facilities. The relatively large storage volume required for natural gas in sufficient quantity under ambient conditions in the vapor phase for ordinary vehicle use renders natural gas less practical for use as a vehicle fuel in such condition.

Other fuels such as gasoline or diesel fuel are in a liquid phase at typical ambient environmental conditions and do not require substantial conditioning for use and may be dispensed to a vehicle and stored/use on a vehicle without substantial inconvenience or substantial reduction in net energy efficiency. Accordingly, it is known to compress or liquefy natural gas for storage and transport in commercial and industrial applications (including for use on vehicles that carry the fuel supply). Natural gas is conditioned into commercially and industrially available compressed natural gas (CNG) and liquid natural gas (LNG).

The energy ordinarily required to condition and maintain CNG and LNG natural gas for storage, transport and use as a fuel under typical ambient environmental conditions reduces the net energy efficiency of natural gas. Capital and operating costs are associated with the physical plant and equipment required to compress, store and maintain CNG for transport and use (e.g. equipment such as compressor systems, suitable pressure vessels and conduits/pipelines, etc.) or to condense/liquefy, store and maintain LNG for transport and use (e.g. refrigeration/heat exchange systems, cryogenic storage vessels, insulated conduits/pipelines, etc.). Although natural gas/methane is a suitable and cost-competitive fuel and readily available to be used as a combustion fuel, the amount of required input energy and the physical plant requirements in systems using CNG or LNG tends to reduce attractiveness of using natural gas as a vehicle fuel, particularly in view of the alternatives such as gasoline and diesel fuel, notwithstanding the relatively cost-efficient and convenient availability of natural gas/methane as a fuel through the present abundance and existing distribution network for methane/natural gas.

SUMMARY

It would be advantageous to provide for a system and method of storing and dispensing fuel and ballast fluid for use in a vehicle and/or facility. It would also be advantageous to provide for a system and method of storing and dispensing fuel and ballast fluid comprising thermal and/or volumetric balance/compensation arrangement between the fuel and ballast fluid to provide enhanced efficiency and operation. It would further be advantageous to provide for a system and method of storing and dispensing fuel and ballast fluid where the fuel and ballast fluid are stored as a cryogenic liquid and dispensed as a vapor. It would further be advantageous to provide for a system and method of storing and dispensing that enhanced the net energy efficiency of using natural gas/methane as a vehicle fuel by using a ballast fluid such as nitrogen in a thermal and/or volumetric compensatory arrangement. It would further be advantageous to provide for a system of storing and dispensing fuel and ballast fluid that is configured to use an abundant resource such as natural gas/methane as a fuel and an abundant resource such as nitrogen/air (and/or oxygen) as a ballast fluid. (The term "natural gas" comprises any fluid that is substantially natural gas; the term "methane" comprises any fluid that is substantially methane. The term "nitrogen" comprises any fluid that is substantially nitrogen; the term "oxygen" comprises any fluid that is substantially oxygen. According to any exemplary embodiment of the system and method, fluids will not require purification but may have conditioning such as filtering or the like as performed in conventional commercial storage and use of such fluids.)

The present invention relates to a system for storing and dispensing a fuel and a ballast fluid. The system comprises a chamber for storing the fuel, a chamber for storing the ballast fluid and a heat transfer system. Fuel dispensed from the fuel chamber is used as a refrigerant for ballast fluid received for storage in the ballast fluid chamber and ballast fluid dispensed from the ballast fluid chamber is used as a refrigerant for fuel received for storage in the fuel chamber.

The present invention also relates to a method of storing and dispensing fuel and a ballast fluid comprising the steps of providing fuel in storage in liquid phase, providing ballast fluid in storage in liquid phase and dispensing fuel from storage through a heat transfer system. The fuel is used as a refrigerant for ballast fluid received for storage through the heat transfer system so that the fuel is converted to vapor phase for dispensing as the ballast fluid is converted to liquid phase for storage.

The present invention further relates to a vehicle configured to use a fuel. The vehicle comprises a power plant powered by the fuel, a drive train coupled to the power plant, and a system for storing and dispensing the fuel and a ballast fluid. The system comprises a chamber for storage of the fuel, a chamber for storage of the ballast fluid and a heat transfer system. The fuel is stored in the fuel chamber in liquid phase and the ballast fluid is stored in the ballast fluid chamber in liquid phase. Fuel is dispensed from the fuel chamber to the heat transfer system as a refrigerant and supplied to the power plant in vapor phase while ballast fluid in vapor phase is supplied to the heat transfer system and cooled by the fuel and condensed to liquid phase for storage in the ballast fluid chamber.

The present invention further relates to a station for dispensing fuel to a vehicle having a system for storing fuel and ballast fluid. The station comprises a source to supply the fuel to the vehicle, a conditioning system configured to regulate the temperature and pressure of the fuel dispensed to the vehicle, and an interface with the vehicle configured to monitor the amount of fuel dispensed to the vehicle. The fuel is stored in the vehicle in liquid phase and the ballast fluid is stored in the vehicle in the liquid phase.

The present invention further relates to a method of operating a station for refueling a vehicle having a system for storing and dispensing fuel and a ballast fluid. The method comprises the steps of (a) conditioning fuel to be dispensed to the vehicle; (b) conditioning ballast fluid received from the vehicle; (c) monitoring the amount of fuel dispensed to the vehicle; (d) monitoring the amount of ballast fluid dispensed from the vehicle; and (e) charging an account associated with the vehicle for the amount of fuel dispensed to the vehicle.

The present invention further relates to a method of retrofitting a vehicle having a power plant comprising the steps of (a) installing a system for storing and dispensing fuel and a ballast fluid; (b) configuring the power plant to use the fuel. The system for storing and dispensing fuel and ballast fluid comprises a chamber for storing the fuel; a chamber for storing the ballast fluid; a heat transfer system wherein (a) fuel dispensed from the fuel chamber is used as a refrigerant for ballast fluid received for storage in the ballast fluid chamber and (b) ballast fluid dispensed from the ballast fluid chamber is used as a refrigerant for fuel received for storage in the fuel chamber.

The present invention further relates to a method of retrofitting a station having a system for storing and dispensing a first fuel. The method comprises the step of installing a system for storing and dispensing a second fuel and a ballast fluid. The system for storing and dispensing the second fuel comprises a chamber for storing the second fuel; a chamber for storing the ballast fluid; a heat transfer system wherein (a) the second fuel dispensed from the fuel chamber is used as a refrigerant for ballast fluid received for storage in the ballast fluid chamber and (b) ballast fluid dispensed from the ballast fluid chamber is used as a refrigerant for the second fuel received for storage in the fuel chamber.

FIGURES

DESCRIPTION

Figure 1:
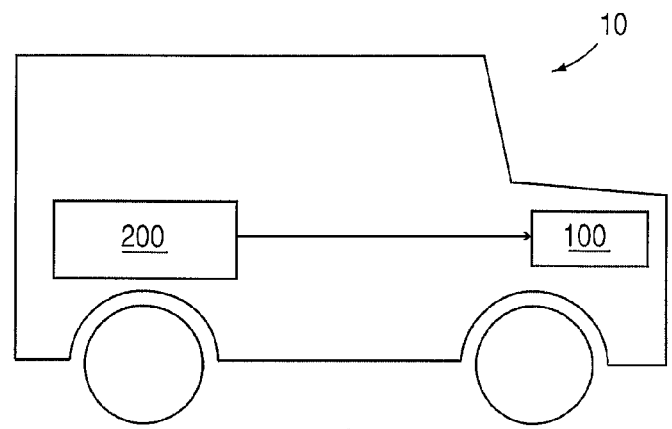
FIG. 1 is a schematic diagram of a vehicle according to an exemplary embodiment.

Referring to FIG. 1, a vehicle 10 is shown schematically. The vehicle may be a passenger vehicle, transport vehicle, commercial vehicle, work vehicle or any other type of vehicle comprising a drive train and controls configured for the particular needs or application (by a conventional arrangement or by any other arrangement). Vehicle 10 comprises a power plant 100 configured to provide power through the drive train for transport of passengers and/or materials such as cargo and for operation of other vehicle systems (such as electrical, heating/cooling, etc.). Vehicle 10 comprises a storage system 200 for fuel or energy that is supplied to power plant 100.

Figure 2A:
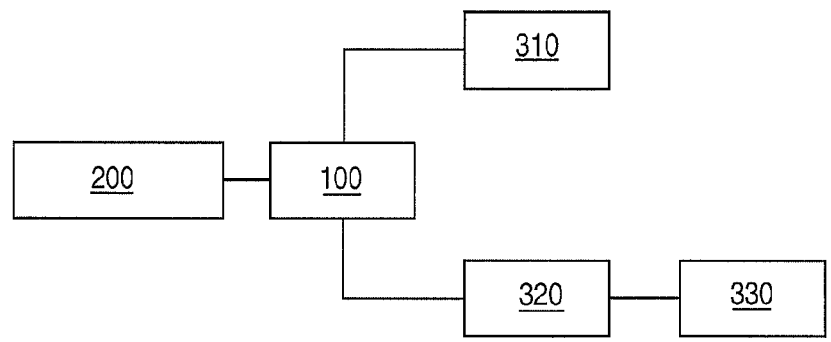
FIGS. 2A and 2B are schematic block diagrams of a power plant system for a vehicle or facility.

As shown schematically in FIG. 2A, power plant 100 converts fuel or energy from storage system 200 into power available for use in a system 310 for propulsion of the vehicle and for use in other systems (e.g. directly or indirectly using mechanical, electrical, thermal, etc. energy generated by power plant 100) shown schematically as system 320 (e.g. generally representative of systems on the vehicle) and system 330 (e.g. generally representative of systems external to the vehicle).

According to any preferred embodiment, the fuel/energy storage system is configured to provide the particular fuel (or fuels) or energy in condition for use in the operation of the power plant (or power plants) of the vehicle. For example, if the power plant of the vehicle comprises a combustion engine configured to use a natural gas as fuel, the storage system will (among other things) be configured to receive, store and supply natural gas in condition for use as a combustion fuel for the engine (e.g. at suitable pressure, temperature, flow rate, volume, quantity, etc.). Natural gas can be provided in a variety of forms, including pure methane, enriched methane (having a variety of gas phase minor constituents in addition to methane) or "out of the ground" compositions (with or without removal of various constituents). (The term "methane" comprises fluids that are substantially methane but that may include other constituents.)

Figure 2B:
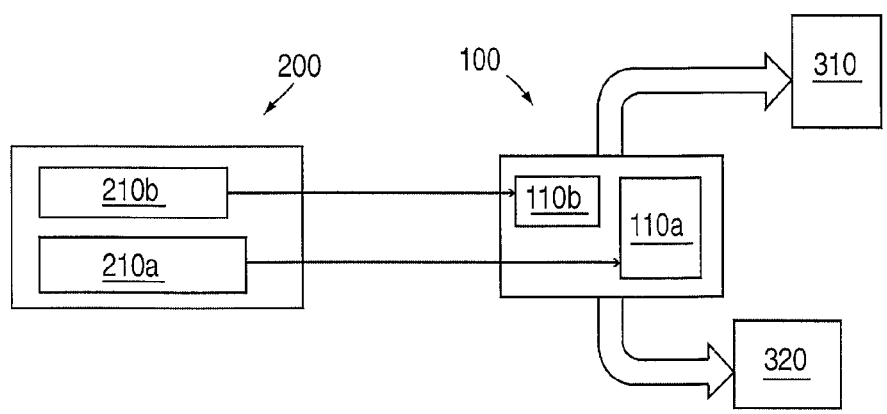
Figure 3:
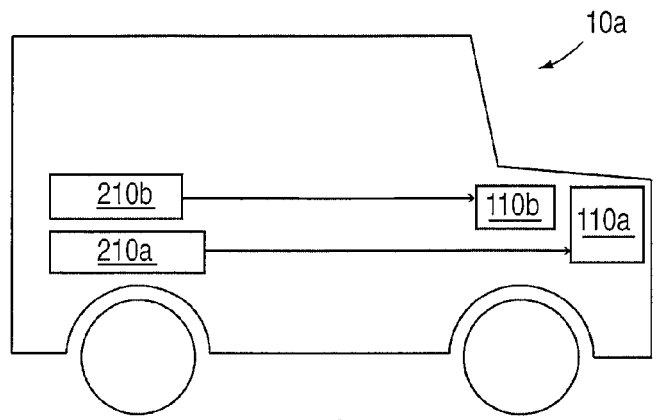
FIGS. 3 and 4 are schematic diagrams of a vehicle according to an exemplary embodiment.

As shown in FIGS. 2B and 3, the vehicle comprises a hybrid vehicle 10a with a power plant 100 comprising first power plant 110a and second power plant 110b. First power plant 110a is supplied fuel or energy from storage system 210a; second power plant 110b is supplied fuel or energy from storage system 210b. Power plant 100 provides energy for use in vehicle propulsion system 310 and other vehicle systems 320. According to an exemplary embodiment, vehicle 10a may be a "bi-fuel" or "dual-fuel" vehicle having a power plant in the form of an engine that can be powered by gasoline and natural gas (e.g. an engine comprising a carburetor that allows the use of gasoline and natural gas as a combustion fuel). According to an exemplary embodiment, the power plant for vehicle 10a may comprise separate power plants, such as an engine powered by natural gas (e.g. supplied by storage system 210b as fuel for combustion) and a motor system powered by electrical energy (e.g. where storage system 210a comprises a battery system). According to other alternative embodiments, the vehicle may be powered by other combinations of energy sources, for example, selected from a group comprising gasoline, diesel fuel, biofuels (such as ethanol, butanol, etc.), natural gas, organic waste, fuel blends, waste oil, biodiesel, electric/battery power, fuel cell, compressed gas, etc. According to any preferred embodiment of the vehicle, one source of energy used as fuel for the vehicle will be natural gas (methane). According to a particularly preferred embodiment, the natural gas/methane may be from any source (e.g. a well or production facility/landfill and/or transported over a networked distribution system) and safely and conveniently available in a cost-efficient manner.

As shown in FIGS. 4 through 10, according to exemplary embodiments, storage system 200 is configured for storing and dispensing a fuel (F) and a ballast fluid (B). The system for storing and dispensing fuel and ballast fluid may be configured for use in a vehicle (e.g. providing fuel for a power plant for motive power or other vehicle systems in personal, commercial, industrial, passenger transportation, shipping/cargo, ground, air, rail, marine or other applications) or in a facility (e.g. providing fuel for a power plant for stationary power/energy generation or other commercial/industrial or office/residential applications). The storage system may be configured for any type of vehicle or facility using natural gas as a fuel.

Figure 4:
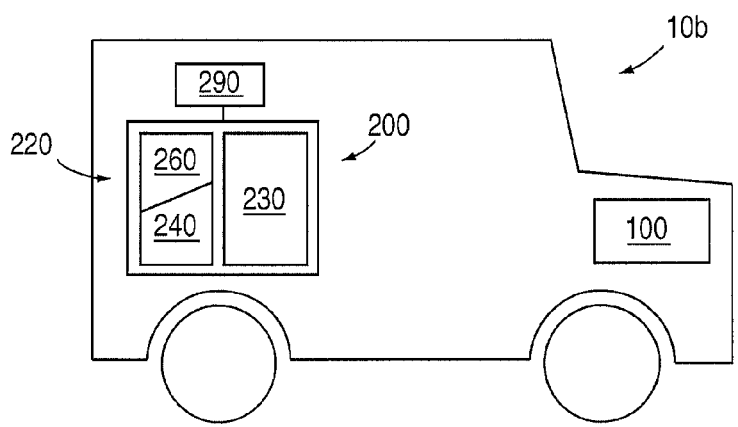

Referring to FIG. 4, a vehicle 10b is shown schematically having a power plant 100 comprising an engine that is configured to be powered by the combustion of a fuel such as natural gas (e.g. methane) provided by a storage system 200. Storage system 200 for the fuel comprises a storage tank or chamber 220 and a conditioning system 230 for regulating (e.g. managing) the condition and supply of fuel for use in the vehicle. According to any preferred embodiment, conditioning system 230 for managing the fuel and storage system may be configured to perform any of a wide variety of functions (including but not limited to conditioning and regulating temperature, pressure, flow rate, volume, moisture, filtration, etc.); conditioning system 230 may also comprise and/or control such apparatus as pumps, compressors, valves, vents, meters and gauges, monitors, filters, etc. according to conventional or other available arrangements.

According to an exemplary embodiment as shown, storage system 200 also may comprise an interface system 290 to allow storage system 200 to interface with other vehicle systems (such as instrumentation and control systems for the vehicle) and with systems outside of the vehicle (such as interfaces or connections that allow storage system to be filled/re-filled, vented, etc.); the interface system may comprise a physical interconnection (e.g. for fluid flow and power/monitoring/regulating connections) and a data/communications link (which may be by a wired or wireless connection and which may facilitate control, metering, accounting, planning, etc. of the system).

As shown in FIG. 4, chamber 220 of storage system 200 comprises a compartment 240 for storage of fuel and a compartment 260 for storage of a ballast fluid. As shown schematically in FIG. 5, the fuel and the ballast fluid each can be stored in a separate tank or container. As shown schematically in FIGS. 7A-B and 8A-C, the fuel and the ballast fluid can be stored in separate chambers within a shared or common tank or container. According to a preferred embodiment, in the operation of the storage system the fuel and the ballast fluid are managed thermally and volumetrically in a compensatory arrangement. See, for example, FIGS. 8A-8C. According to an exemplary embodiment, the storage system is configured to store both the fuel (in compartment 240) as a liquid and the ballast fluid (in compartment 260) as a liquid (e.g. each liquid being stored cryogenically at a temperature below its respective boiling point).

Figure 5:
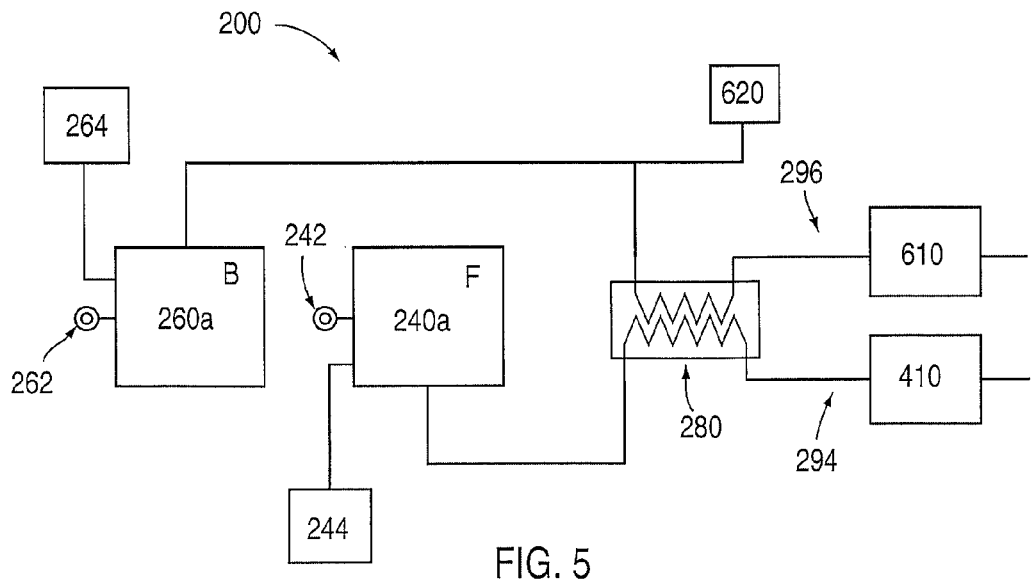
FIG. 5 is a schematic block diagram of a storage system for fuel and a ballast fluid according to an exemplary embodiment.

Referring to FIG. 5, storage system 200 is shown schematically according to an exemplary embodiment. A tank 240a is provided for (liquid) fuel F with an instrumentation and control system 242 and a system 244 for management and conditioning (e.g. regulating and conditioning temperature, pressure, flow rate, volume, purity, etc.) of the fuel for use; tank 240a is connected to a supply/outlet line 294 via a heat transfer system 280. A tank 260a is provided for (liquid) ballast fluid B with an instrumentation and control system 262 and a system 264 for management and conditioning (e.g. regulating and conditioning temperature, pressure, flow rate, volume, purity, etc.) of the ballast fluid; tank 260a is connected to a supply/outlet line 296 via heat transfer system 280. As shown, tank 240a and tank 260a may be connected in a manner that allows for operation of the system using the fuel and the ballast fluid in a compensatory arrangement intended to achieve enhanced performance and efficiency.

A source/outlet 410 for the fuel and a source/outlet 610 for the ballast fluid are shown schematically in FIG. 5. Source/outlet 410 may comprise an outlet in the form of a power plant or engine to which fuel is dispensed and a source in the form of a station where a supply of fuel is available and from which fuel is supplied to the system. A source/outlet 610 for the ballast fuel is shown schematically. Supply/outlet line 294 for fuel is connected to fuel source/outlet 410; supply/outline line 296 for ballast fluid is connected to ballast fluid source/outlet 610. According to a preferred embodiment of the storage system, the fuel outlet is the power plant; the fuel source may comprise any suitable source or supply of fuel, for example a filling station or terminal; the ballast fluid outlet may be a receptacle or tank (or alternatively a vent to the outside/ambient atmosphere); the ballast fluid source may comprise any suitable source or supply of ballast fluid such as a supply tank or connection to a supply source or connection to the ambient atmosphere. As shown, a supplemental supply 620 of ballast fluid may also be provided (e.g. in the form of a tank/reserve tank or chamber). According to an exemplary embodiment, the supplemental supply (e.g. shown as supply 620) may be stored in liquid phase (either in a separate tank or as extra volume within the tank, such as tank 260a). According to an exemplary embodiment (not shown in FIG. 5), the supplemental supply may be stored in the vapor phase. According to an exemplary embodiment, the fuel tank or and/or be ballast fluid tank can also have inlet/outlet ports to receive/dispense their liquid phase fluids into/from the tanks without passing through the heat exchange system; the inlet/outlet ports can, for example, be used to directly provide liquid fuel or ballast fluid from a tank in a station to a tank in a vehicle.

As shown schematically in FIG. 5, according to an exemplary embodiment, operation of storage system 200 involves a compensatory relationship between the fuel and the ballast fluid. When fuel is discharged from tank 240a through outlet line 294 and heat transfer system 280, ballast fluid is supplied to tank 260a through supply line 296 and heat transfer system 280. When fuel is supplied to tank 240a through supply line 294 and heat transfer system 280, ballast fluid is discharged from tank 260a through outline line 296 and heat transfer system 280. According to any preferred embodiment, fuel is stored in chamber 240 in the liquid phase; fuel is supplied or used at source/outlet 410 in the vapor phase; ballast fluid is stored in chamber 260 in the liquid phase; ballast fluid is supplied or used at source/outlet 610 in the vapor phase.

According to an exemplary embodiment, the heat transfer system for the fuel and the ballast fluid can be configured to facilitate operation of a thermal compensatory arrangement between the fuel and the ballast fluid during the operation of the storage system. In the operation of storage system 200, the compensatory relationship between the fuel and ballast fluid is managed by use of heat transfer system 280. Heat transfer system 280 uses the ballast fluid as the heat exchange medium for the fuel and the fuel as the heat exchange medium for the ballast fluid. As liquid fuel is discharged from chamber 240 into heat transfer system 280 simultaneously vapor ballast fluid is supplied from source 610 into heat transfer system 280; as vapor fuel is supplied at source 410 into heat transfer system 280 simultaneously liquid ballast fluid is discharged from chamber 260 into heat transfer system 280.

Heat transfer system 280 is configured to cool and condense fuel supplied at source 410 in the vapor phase into fuel stored in chamber 240 in the liquid phase and to heat and evaporate fuel discharged from chamber 240 in the liquid phase into fuel supplied at outlet 410 in the vapor phase (e.g. for combustion in the power plant).

In heat transfer system 280, the fuel and the ballast fluid each substantially undergo a respective liquid-vapor/vapor-liquid phase change. When liquid fuel is to be evaporated to a vapor for use (e.g. combustion), the liquid-to-vapor fuel is discharged from chamber 240 as a liquid and heated and evaporated for supply to outlet 410 as a vapor by heat exchange with ballast fluid; vapor-to-liquid ballast fluid is supplied from source 610 as a vapor and cooled and condensed for supply to chamber 260 as a liquid by heat exchange with fuel. When vapor fuel is to be condensed to a liquid for storage, the vapor-to-liquid fuel is supplied from source 410 as a vapor and cooled and condensed for supply to chamber 240 as a liquid by heat exchange with ballast fluid; the liquid-to-vapor ballast fluid is discharged from chamber 260 as a liquid and heated and evaporated for supply to outlet 610 as a vapor by heat exchange with fuel.

Figure 7A:
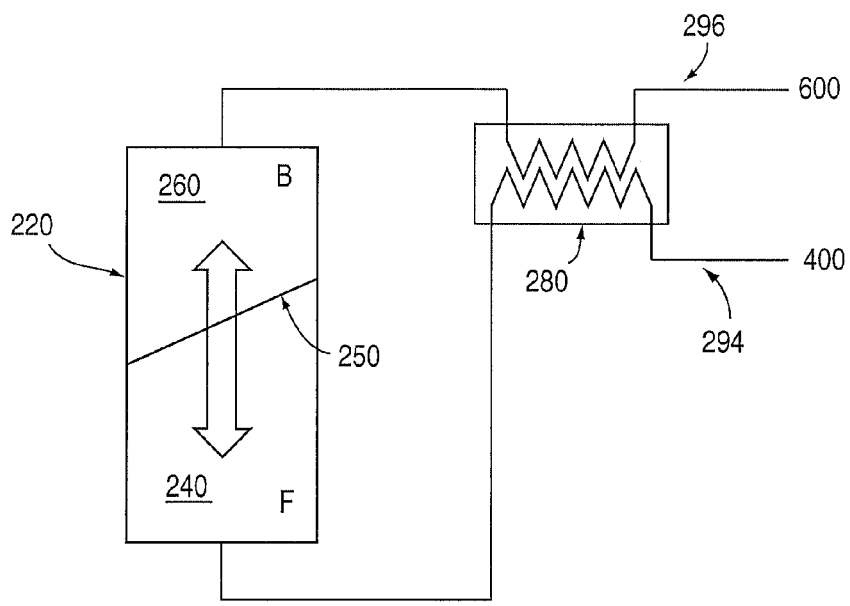
FIGS. 7A and 7B are schematic block diagrams of a storage system for fuel and ballast fluid according to an exemplary embodiment.
Figure 7B:
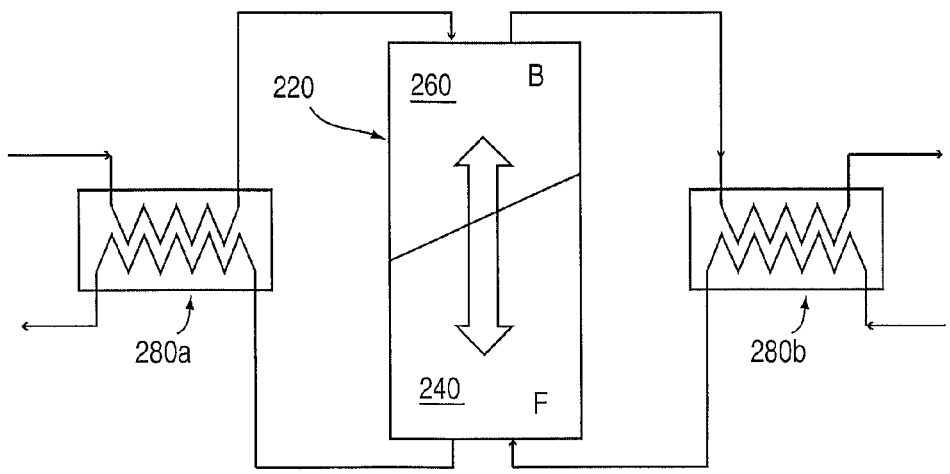

As shown in FIGS. 5 and 7A-B, the heat transfer system comprises a heat exchanger arrangement (e.g. which may comprise one or multiple heat exchangers). According to an exemplary embodiment, the heat transfer system may comprise a heat exchanger configured in a counter-flow arrangement or cross-flow arrangement for the fuel and the ballast fluid. According to a preferred embodiment, the heat transfer system comprises a microchannel heat exchanger (which is compact in size but able to provide suitable heat transfer rates between the fuel and the ballast fluid in the smaller physical space). According to any preferred embodiment, the heat exchanger or set of heat exchangers can be arranged (e.g. sized and configured) using generally conventional technology to provide sufficient flow rates and heat transfer rates to refrigerate and condense the fuel supplied for storage according to the conditions (e.g. temperature, pressure, flow rates, mass and volume, fluid properties, time constraints, etc.) and to use the fuel discharged for use (e.g. in the power plant) to refrigerate and condense the ballast fluid supplied for storage. Any suitable arrangement of conventional or other heat exchanger technology may be employed according to an exemplary embodiment of the system. According to a particularly preferred embodiment the heat transfer system will employ a compact and efficient counter-flow arrangement for heat transfer between the fuel and the ballast fluid.

According to an exemplary embodiment, the heat transfer system may comprise a single heat exchanger (see FIG. 7A) or multiple heat exchangers (see FIG. 7B) or a set of heat exchangers configured in series or parallel (including heat exchangers having different configurations); the heat transfer system may be connected to or comprise an instrumentation and control system that allow will the operation to be monitored and performance adjusted to desired conditions (e.g. temperature drop/increase, flow rates, etc. for the fuel and ballast fluid supplied to each heat exchanger) as possible by a control system. As shown in FIG. 7A, heat transfer system 280 (which is configured for bidirectional flow of the fuel and of the ballast fluid) is used both for cooling/liquefying the fuel for storage and for heating/vaporizing the fuel for use. With flow in the first direction, heat transfer system 280 is used for heating/vaporizing the fuel discharged from compartment 240 using ballast fluid supplied from a source as a vapor; the ballast fluid is cooled/liquefied by the fuel and stored in compartment 260. With flow in the second direction (reversed), heat transfer system 280 is used for cooling/liquefying the fuel supplied to compartment 240 using ballast fluid discharged from compartment 260 as a liquid; the ballast fluid is heated/vaporized by the fuel and discharged to an outlet. As shown in FIG. 7B, heat transfer system may comprise two heat transfer systems 280a and 280b. Heat transfer system 280a is used for heating/vaporizing the fuel discharged from compartment 240 using ballast fluid supplied from a source as a vapor; the ballast fluid is cooled/liquefied by the fuel and stored in compartment 260. Heat transfer system 280b is used for cooling/liquefying the fuel supplied to compartment 240 using ballast fluid discharged from compartment 260 as a liquid; the ballast fluid is heated/vaporized by the fuel and discharged to an outlet. According to any preferred embodiment, the heat transfer system of the storage system will be operated so that neither fluid (fuel or ballast fluid) freezes to solid (or partial solid) during operation of the system.

Figure 6:
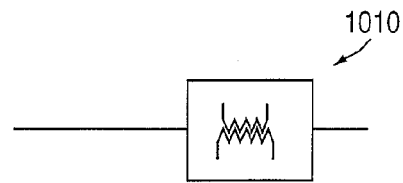
FIG. 6 is a schematic block diagram of a conditioning system for a storage system for fuel and ballast fluid according to an exemplary embodiment.

As shown in FIG. 6, the system may comprise a conditioning system 1010 connected to the source/outlet 410 for fuel and/or to the source/outlet 610 for ballast fluid. Conditioning system may comprise a heat exchanger, for example, to condition the fuel before it is supplied to the power plant for combustion or to use ballast fluid or fuel as a medium for heat exchange within another fluid within the vehicle (e.g. for air conditioning or refrigeration) or in another heat pump application.

Referring to FIGS. 7A-B and 8A-C, storage system 200 is shown schematically according to an exemplary embodiment. As shown, chamber 240 for fuel and chamber 260 for ballast fluid share a common volume in a tank or container 220. According to a particularly preferred embodiment, the energy efficiency of the storage system is intended to be enhanced by maintaining the fuel and the ballast fluid at approximately the same temperature (i.e. reducing heat transfer between the fuel and ballast fluid). The fuel and the ballast fluid do not intermix and are separated by a physical boundary or wall (shown schematically as membrane or septum 250 which may be rigid or flexible and may be movable but is generally impermeable); the fuel and the ballast fluid are generally in thermal contact by conduction across wall 250 (which may use a thermally conductive material or design) and by other heat transfer mechanisms (e.g. convection, radiation) as will tend to maintain approximately the same temperature within both chambers in the tank.

Figure 8A:
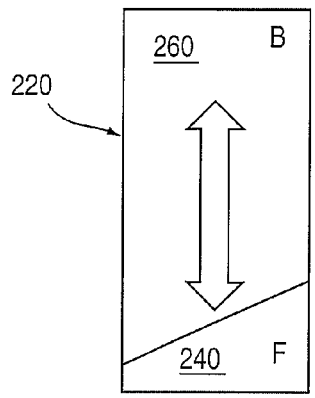
FIGS. 8A through 8C are schematic block diagrams showing the storage and discharge of fuel and ballast fluid from a storage system according to an exemplary embodiment.
Figure 8B:
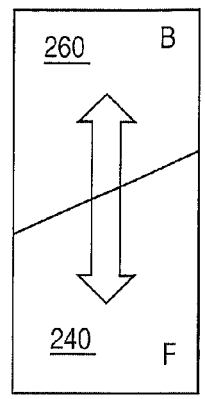
Figure 8C:
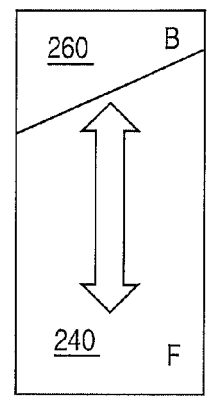

As shown in FIGS. 8A-8C, according to an exemplary embodiment, the tank or container for the fuel and the ballast fluid can be configured to facilitate operation of a volumetrically compensatory arrangement between the fuel and the ballast fluid during the operation of the storage system. As shown, chamber 240 for the fuel and chamber 260 for the ballast fluid share a common volume in chamber or container 220; the total volume of container 220 is fixed but the separate volume occupied by chamber 240 and the separate volume occupied by chamber 260 each may vary (as indicated by movement of the divider or septum) as a share of the total available volume of container 220. The volume of chamber 240 occupied by the fuel will vary as fuel is discharged (dispensed) for use or loaded (supplied) for storage. As fuel is discharged and the volume occupied by chamber 240 within container 220 is reduced, additional ballast fluid may be supplied to chamber 260; the volume occupied by chamber 260 will expand as the volume occupied by chamber 240 is reduced. The additional volume of ballast fluid that is provided to the chamber is then available to facilitate the cooling/liquefying of fuel that will be supplied to the storage system at refueling. As fuel is loaded for storage and the volume occupied by chamber 240 within container 220 is expanded, ballast fluid may be discharged from chamber 260; the volume occupied by chamber 240 will expand as the volume occupied by chamber 260 is reduced. The filled volumes of chambers 240 and 260 may (e.g. in a fully or approximately equalized configuration) be approximately equal to each other; according to other embodiments, volumes are not fully equalized, e.g. the filled volumes of chamber 240 and chamber 260 will not be substantially equal.

According to a particularly preferred embodiment, the system is operated in a thermally compensatory/balanced manner so that when fuel is loaded, there is a sufficient amount of (liquid) ballast fluid available to convert the fuel to liquid phase for storage; when fuel is dispensed, it will convert a compensatory/balanced amount of ballast fluid to liquid phase for storage. According to a preferred embodiment, the fuel and ballast fluid can be thermally matched, each a fluid with a similar boiling point, heat of vaporization and specific heat. According to any preferred embodiment, the fuel and ballast fluid will be stored under conditions where each fluid has a similar boiling point temperature. According to a particularly preferred embodiment, the pressure in each of the containers for fuel and the ballast fluid is regulated so that the fluids are stored with approximately equal boiling point temperatures. The fuel and the ballast fluid can be selected and conditioned so that each fluid changes between its respective liquid phase and vapor phase at approximately the same temperature (or within a relatively similar temperature range). According to an exemplary embodiment, thermal compensation between the fuel and the ballast fluid is not completely equalized (e.g. because of an emphasis on volumetric compensation, or because of thermal/heat leaks from the ambient environment). According to such embodiments, the system can provide additional refrigeration to either the ballast fluid or the fuel in order to maintain their cryogenic storage temperatures at desired values; in one embodiment; additional refrigeration can be used to liquefy additional ballast fluid for delivery to a reserve tank. The energy for refrigeration can be provided by any available source, including by combustion of the fuel. Ballast fluid can be preferentially evaporated and vented in response to thermal/heat leaks or pressure build-up in cryogenic/storage tanks as part of the general management of the system (e.g. to reduce associated risks, including environmental risks associated with venting fuel, other risks involved in handling fuel and cryogenic fluids, etc. as known to those of skill in the art).

According to a preferred embodiment, in the storage system the fuel (e.g. natural gas or methane) and the ballast fluid (e.g. air, oxygen or nitrogen) are stored cryogenically in a suitable temperature range as to maintain each fluid as a cryogenic liquid (e.g. below the boiling point but above the freezing point). According to an exemplary embodiment, the fuel and ballast fluid will be stored in separate chambers or tanks; the tanks may be insulated and otherwise designed/configured for cryogenic storage. If the fuel and ballast fluid are stored in a shared or common tank or container, the storage temperature can be maintained below the lowest respective boiling point of either fluid and above the highest respective freezing point of either fluid. According to an exemplary embodiment, tank (e.g. chamber 220 shown in FIG. 8 along with and its fittings and connecting lines) is insulated and configured to maintain cryogenic conditions (e.g. using the concepts of an insulated Dewar vessel or flask); the chamber for each cryogenic liquid will also be configured to maintain the cryogenic conditions (e.g. temperature and pressure) in operation with minimal thermal losses and fluid volume loss or leakage. By maintaining each cryogenic liquid in a chamber in a common tank where a surface area of one chamber is adjacent to or in contact with a surface area of the other chamber, maintenance of cryogenic temperatures can be better be facilitated with reduced heat transfer between the fluids. Storage in a common tank or container with each chamber at an approximately equal temperature will reduce heat transfer between the cryogenic liquids in the common tank and facilitate thermal efficiency of the system.

According to an exemplary embodiment, the fuel may be natural gas (e.g. comprising methane) and the ballast fluid may be nitrogen (e.g. obtainable from ambient atmospheric air). Methane (the main component of natural gas) has a boiling point of approximately 110-111 degrees K (at one atmosphere) and a freezing point of approximately 91 degrees K; nitrogen has a boiling point of approximately 77 degrees K (at one atmosphere); ambient air (approximately 78 percent nitrogen and 21 percent oxygen) has a boiling point of approximately 78 degrees K (at one atmosphere). The boiling point temperature of the fuel and the balance fluid may be adjusted to some degree by adjusting the pressure. Methane has a boiling point of approximately 95 degrees K at a pressure of approximately 0.21 bar; nitrogen has a boiling point of approximately 95 degrees K at a pressure of approximately 5 bars. By maintaining the fuel chamber at a pressure of approximately 0.21 bar and the ballast fluid chamber at a pressure of approximately 5 bars, the fuel (methane) and the ballast fluid (nitrogen) each can be maintained in storage in the tank as a cryogenic liquid at the same temperature just below approximately 95 degrees K. According to other alternative embodiments of the system, the temperature and pressure of operation may be determined by the fluids selected and used.

According to any preferred embodiment, the chambers or containers within the tank of the storage system will be configured to adjust in size and volume during operation and to maintain thermal contact between the fuel and the ballast fluid without allowing any intermixing. According to a particularly preferred embodiment, each chamber can be configured as a flexible bladder of a material suitable to withstand the cryogenic temperatures and pressure and volumetric requirements for the application (e.g. polyfluorides such as Halar). According to alternative embodiments, the system may have a chamber configured in any suitable arrangement to satisfy the necessary operating conditions (temperature and pressure), such as a multi-tank arrangement (see, e.g., FIG. 5 showing the fuel and the ballast fluid each stored in a separate tank or container).

Figure 9:
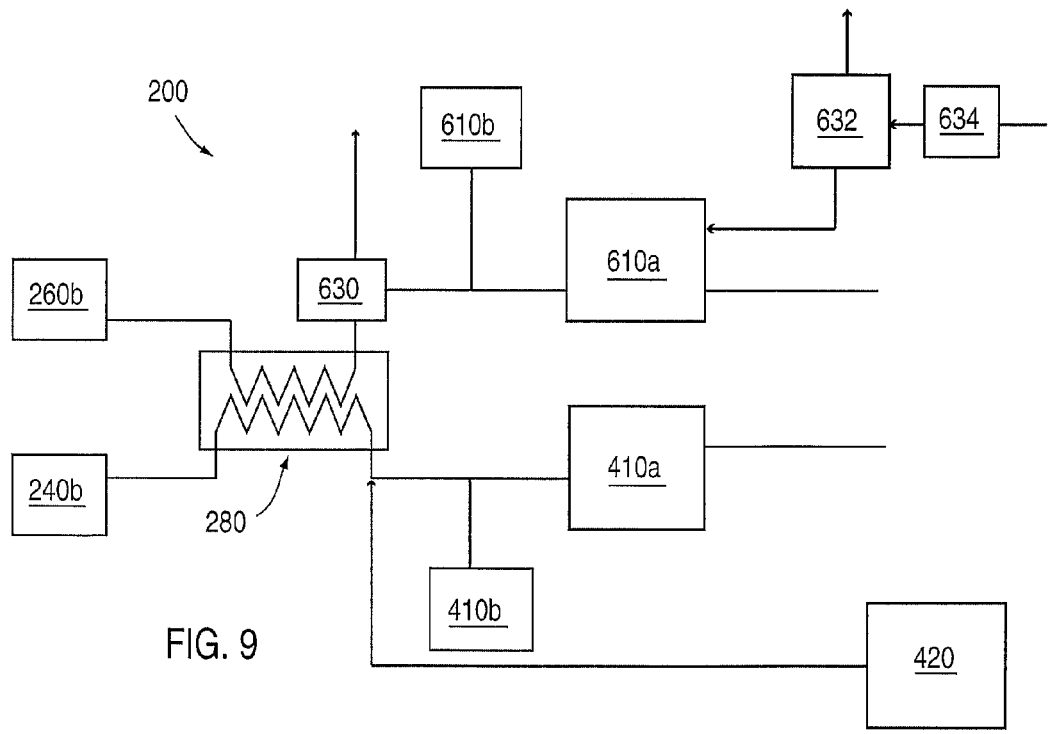
FIG. 9 is a schematic block diagram of a storage system for fuel and ballast fluid according to an exemplary embodiment.

FIG. 9 is a schematic block diagram of a storage system 200 for fuel and ballast fluid according to an exemplary embodiment. Storage system 200 comprises a tank or chamber 240*b* for fuel in the liquid phase and a tank or chamber 260*b* for ballast fluid in the liquid phase; fuel is selectively (e.g. using a control valve) supplied from a source 410*a* or discharged to an outlet 410*b*; ballast fluid is selectively (e.g. using a control valve) supplied from a source 610*a* or discharged from an outlet 610*b*. Heat transfer system 280 is used to cool/condense the fuel using the ballast fluid and to heat/evaporate the fuel using ballast fluid. System 200 also comprises a conditioning system 632 for collecting and supplying ballast fluid and a system 420 for providing fuel (e.g. from a reserve or holding tank). According to an exemplary embodiment, the ballast fluid is collected (obtained) as a constituent of atmospheric air, for example, air itself, nitrogen, oxygen, or a nitrogen-oxygen mixture (in non-air proportion). To separate nitrogen or oxygen from atmospheric air for use in system 200, conditioning system 632 will comprise a pressure swing adsorption separation system; atmospheric air may be collected (e.g. at ambient conditions) and filtered/purified and compressed by a compressor system 634 before supplied to the pressure swing adsorption system. The separation system may be located (as shown) within the ambient temperature portion of the ballast fluid system, or it may be located in a colder portion (e.g. between tank 260*b* and heat transfer system 280) to take advantage of the cryogenic spread of oxygen and nitrogen vapor pressures. When nitrogen and/or oxygen have been separated from the atmospheric air (and moisture and impurities substantially removed), the nitrogen and/or oxygen is available for recombination or separate use as ballast fluid to be supplied at source 610*a* or for other use. If nitrogen from atmospheric air is used as the ballast fuel, oxygen and other components of the atmospheric air that are not used can be vented from system 632 (or captured and used or sold). One use for such oxygen is for combustion with the natural gas fuel. According to any preferred embodiment, the ballast fluid will comprise a fluid that can be vented into ambient air (e.g. that is not considered a pollutant at the level of concentration); as shown, excess or unwanted ballast fluid may be vented from system 200 (at a vent system 630). According to a particularly preferred embodiment, the ballast fluid will be nitrogen which is considered to be inert and can be vented to the atmosphere or recovered from the atmosphere using conventional technology (e.g. pressure swing adsorption separation system).

According to any preferred embodiment, the system is configured and the fuel and the ballast will be selected and stored and used to achieve operating efficiencies while presenting no unreasonable risk or danger. According to an exemplary embodiment, the fuel will be natural gas (e.g. methane); natural gas is available in relative abundance and in many municipalities/communities is readily available through existing transportation and delivery infrastructure (e.g. by network/pipeline for homes and businesses that presently use natural gas for heating and cooking and industrial processes); source 410*a* for fuel will comprise a conventional tap into the existing natural gas supply line (e.g. at room temperature and low/atmospheric pressure). The fuel may be prepared cooled and condensed for compact storage in the liquid phase using the ballast fluid as a refrigerant; the fuel is then available for use as a refrigerant to cool and condense the ballast fluid for compact storage in the liquid phase when the fuel is discharged from storage. According to any preferred embodiment, typical operation of system 200 will not require substantial mechanical work (e.g. compression) or the associated equipment/physical plant (compressors, etc.) (after initial commissioning of the system on the vehicle); the fuel and the ballast fluid are maintained at cryogenic liquid temperatures but at pressures relatively close to atmospheric pressure.

As schematically shown in FIG. 5, system 200 may also comprise a conditioning system 244 to adjust and maintain the pressure and temperature of the fuel (in chamber 240 with instrumentation and control system 242) and a conditioning system 264 to adjust and maintain the pressure and temperature of the ballast fluid (in chamber 260 with instrumentation and control system 262). The conditioning system may comprise a compressor powered (driven) directly or indirectly by the power plant of the vehicle or facility/station, for example, using mechanical energy (e.g. rotational energy from a shaft or power take-off coupled to the engine) or may use available heat (e.g. heat pump arrangement using waste heat from the power plant or by an absorption cooler using waste heat).

Ballast fluid may be obtained from source or supply or may be obtained from ambient air. Ambient environmental air under typical atmospheric conditions near sea level comprises substantially a combination of nitrogen (approximately 77-80 percent) and oxygen (approximately 18-20 percent). The ballast fluid may comprise nitrogen or oxygen or a combination of nitrogen and oxygen, for example, in the form of purified air. According to an exemplary embodiment, the system may also comprise a reserve or make-up tank or supply of ballast fluid which can be used as necessary to refrigerate/cool and condense fuel supplied to the system for storage. Make-up ballast fluid may be supplied directly to the heat exchanger or added to the ballast fluid tank or chamber for storage. According to a particularly preferred embodiment, for example, where the ballast fluid is obtained from ambient/atmospheric air (e.g. nitrogen), ballast fluid may be obtained and conditioned and stored during off-peak energy hours (e.g. evenings) or when surplus energy is available for the system; according to an alternative embodiment, ballast fluid may be obtained and conditioned and stored essentially at a continuous a slow rate (e.g. the ballast fluid chamber and/or reserve tank may be "trickle charged").

Figure 10:
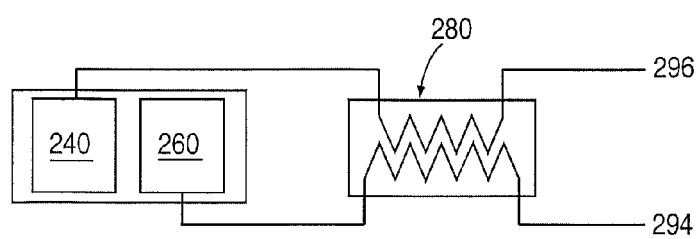
FIG. 10 is a schematic block diagram of a storage system for fuel and ballast fluid according to an exemplary embodiment.

FIG. 10 is a schematic block diagram of a storage system 800 for fuel and ballast fluid according to an exemplary embodiment. The storage system may be provided in a vehicle or station (installation) of the type shown in FIGS. 1, 4, 16-17, 19A-B (for example) or may be provided in a filling/refueling station or terminal as shown as system 800 in FIGS. 11 through 14 (for example).

A station for refueling a vehicle having a storage system for fuel and ballast fluid is shown schematically according to exemplary embodiments in FIGS. 11 through 15 and 20B. According to any preferred embodiment, the station is configured to supply fuel and ballast fluid to a vehicle at refueling; fuel may be supplied to the station at ambient conditions from a distribution network (e.g. if the fuel is natural gas/methane, by connection to natural gas service from a utility) and to the vehicle after conditioning; ballast fluid may be obtained from vehicles at refueling and/or may be obtained from a source or supply and conditioned for use in the system (e.g. if the ballast fluid is nitrogen, nitrogen may be obtained through a system to extract nitrogen from atmospheric air or recovered from the vehicle during refueling). The station may maintain and store fuel and ballast fluid in liquid phase, in vapor phase and/or in both the liquid phase and vapor phase. The station may store/maintain liquid ballast fluid that is available to refrigerate fuel that is supplied for storage in the vehicle or in the station; the station may be configured to use liquid ballast fluid stored in the vehicle that is dispensed during fueling to refrigerate fuel that is supplied for storage in the vehicle. The station may be configured to supply fuel and/or ballast fluid to the vehicle; the system may be configured to receive fuel and/or ballast fluid from the vehicle.

The system is configured for installation at a commercial, industrial, municipal, residential, government/military or other facility where a refueling station for a vehicle may be desired. The station, if at a residence (home) or office may be configured to operate at off-peak hours; the station if at a commercial facility may be configured for a cost-efficient and time efficient retail transaction with a consumer. The system may also be configured to condition the fuel (e.g. temperature, pressure, flow rate, etc.) for the vehicle as it is supplied to the vehicle. According to a particularly preferred embodiment, the fuel comprises natural gas that is supplied to the station by a distribution network in the vapor phase (e.g. as a compressed gas transported through a conduit or pipeline) and then refrigerated/cooled and condensed to liquid phase through a heat transfer system that uses ballast fluid (e.g. nitrogen) from the storage system on the vehicle as a refrigerant and conditioned for storage in the storage system on the vehicle.

Figure 11:
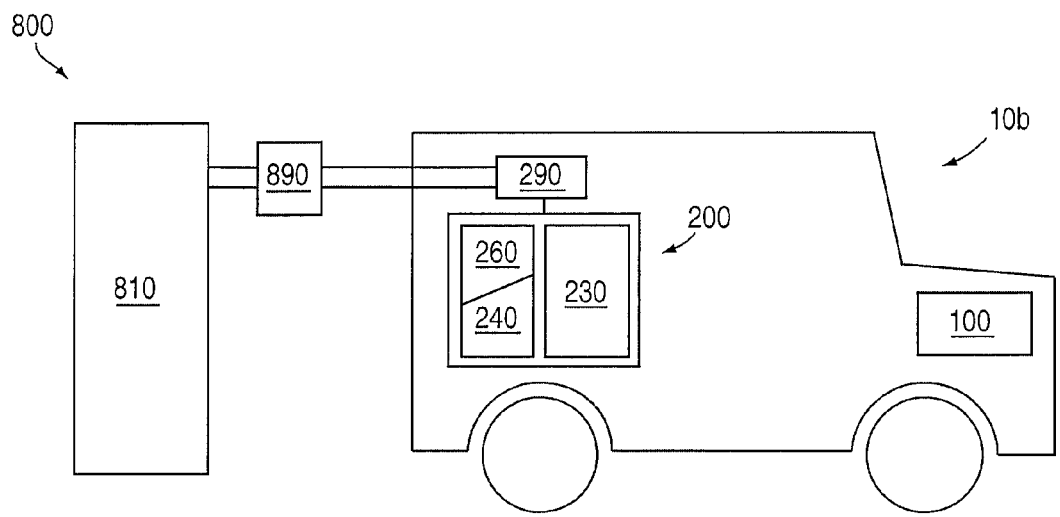
FIG. 11 is a schematic diagram of a system for refueling a vehicle with a storage system for fuel and ballast fluid.

FIG. 11 is a schematic diagram of a system for refueling a vehicle with a storage system for fuel and ballast fluid that can be installed at a station. As shown schematically in FIG. 11, system 800 comprises a tank system 810 that is connected to vehicle 10 through an interface 890. As shown schematically, vehicle 10 comprises a storage system 200 using fuel and ballast fluid and a power plant 100; storage system 200 comprises a fuel chamber 240 and a ballast fuel chamber 260 as well as a conditioning system 230 and an interface 290. As shown schematically, vehicle 10 may be connected to the station for refueling by connecting vehicle interface 290 to station interface 890.

Figure 12A:
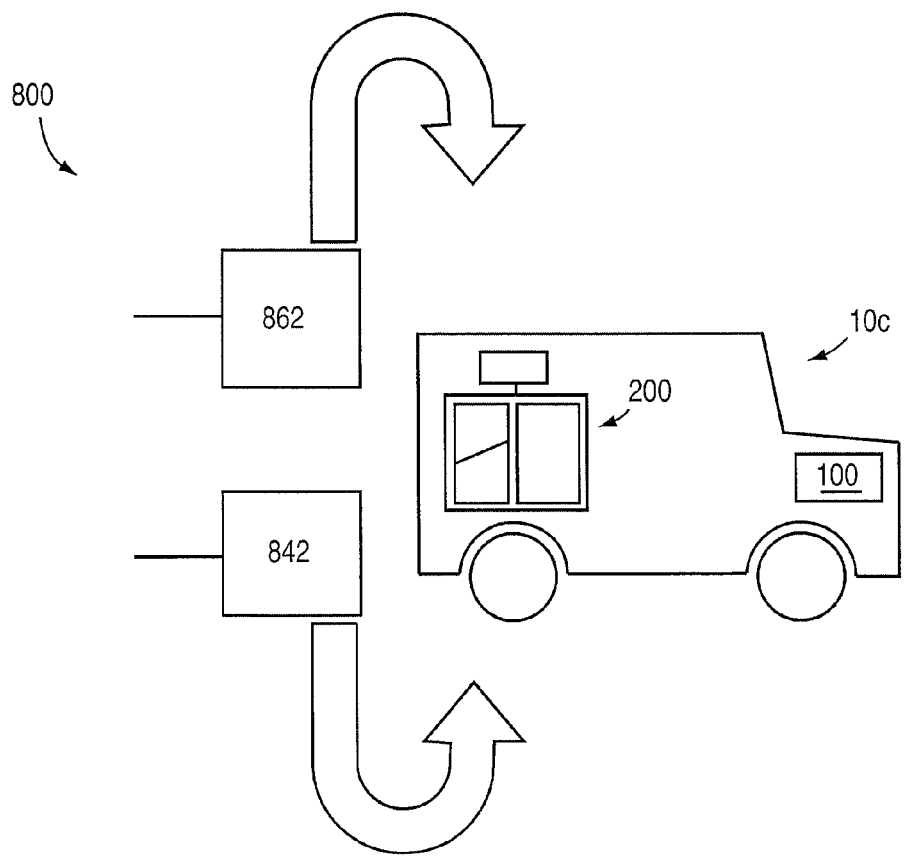
FIGS. 12A through 12C are schematic diagrams showing the operation of a system for refueling a vehicle with a storage system for fuel and ballast fluid.
Figure 12B:
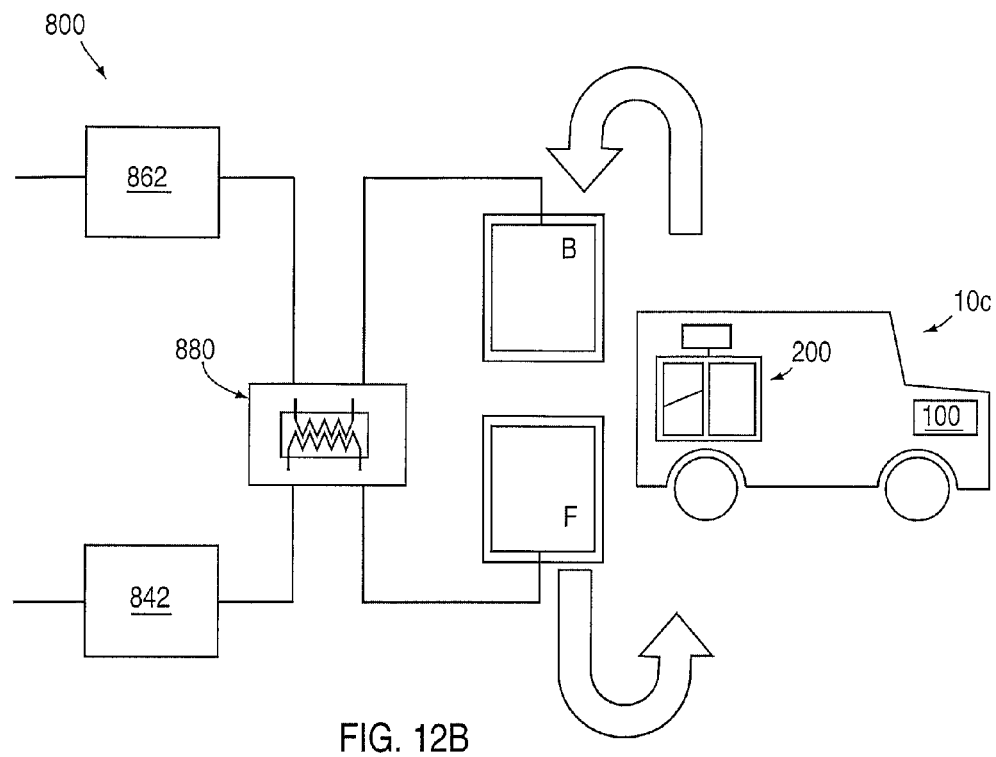
Figure 12C:
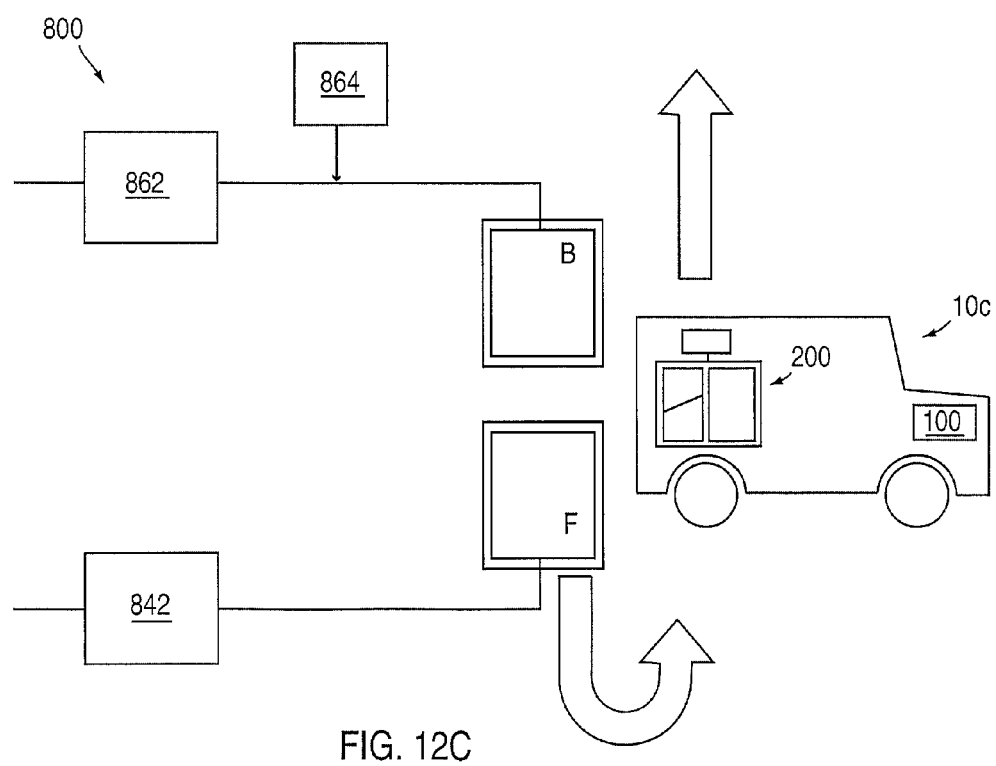

FIGS. 12A through 12C are schematic diagrams showing exemplary embodiments of a system for refueling a vehicle 10 that comprises a system 200 for storing and dispensing fuel and ballast fluid in operation. As shown in vehicle 10 in FIGS. 11 through 12C, storage system 200 comprises fuel tank 240 and ballast fluid tank 230 as well as a conditioning system 230 configured to condition and regulate stored fuel and stored ballast fluid at desired conditions (e.g. temperature, pressure, etc.). FIG. 12A shows the commissioning of vehicle 10 at the station when the vehicle is supplied with both fuel and ballast fluid for storage. FIGS. 12B and 12C show refueling of a vehicle with fuel as ballast fluid is dispensed or discharged from the vehicle.

FIG. 12A shows a station with a system 800 comprising a source/outlet 842 for fuel and a source/outlet 862 for ballast fluid; fuel and ballast fluid will flow between system 200 on vehicle 10 and system 800. As shown in FIG. 12A, during commissioning, fuel is supplied from outlet 842 and ballast fluid is supplied from outlet 862. As shown schematically in FIG. 12A, storage system 200 of vehicle 10c is being commissioned and charged with a supply of both fuel and ballast fluid (in an intended or predetermined ratio) to be held separately in chambers within storage system 200. According to an exemplary embodiment storage system can initially be charged with fuel and ballast fluid in liquid phase; the initial ballast fluid then can be used to cool/liquefy remaining fuel provided to storage system 200 at ambient temperature.

FIG. 12B shows a station with a system 800 comprising storage chamber 842 for fuel and storage chamber 862 for ballast fluid; system 800 also comprises a heat transfer system 880. As shown schematically in FIG. 12B, storage system 200 of vehicle 10c is being refueled with fuel F while ballast fluid B from storage system 200 of vehicle 10c is being returned to system 800; ballast fluid dispensed from storage system 200 creates volume for fuel supplied to storage system 200. As shown in FIG. 12B, fuel F for supply to vehicle is cooled/liquefied for storage in liquid phase in vehicle 10 in heat transfer system 880 in counterflow with cooled/liquified ballast fluid B dispensed from vehicle 10. Ballast fluid B is received in storage chamber 862 where it can be conditioned for reuse or discharged.

FIG. 12C shows a station with a system 800 comprising storage for fuel 842 and storage for ballast fuel 862 along with a reserve tank system 864 for ballast fluid; ballast fluid stored in the vehicle is being vented to ambient environmental conditions during refueling. As shown schematically in FIG. 12C, storage system 200 of vehicle 10 is being refueled with fuel F from source 842 of system 800; ballast fluid B is vented from storage system 200 of vehicle 10 to create volume (space) for storage of fuel. Storage of ballast fuel is available at the station if ballast fuel is to be supplied to the vehicle or received from the vehicle. According to an exemplary embodiment, the ballast fluid is a fluid that can safely and appropriately be vented to the atmosphere (e.g. nitrogen, oxygen, air, or the like). The reserve tank is provided so that the ballast fluid is readily available to make up for volume losses or as a supplemental refrigerant (e.g. to make up thermal losses). The reserve tank system may also comprise a compressor or pump to adjust the pressure of the ballast fluid.

According to an alternative embodiment, the system may also be configured so that the ballast fluid supplied and received from vehicles may have different compositions; for example, a vehicle may be supplied with nitrogen as a ballast fluid; a nitrogen-oxygen mixture (e.g. air or the like) may be received as a ballast fluid. The system will be configured to condition (e.g. separate if necessary or combine or reconstitute) and store (including in separate chambers if suitable) the ballast fluid received from a vehicle. For example, if oxygen is received as the ballast fluid from one vehicle and nitrogen is received as the ballast fluid from another vehicle, the system may store the oxygen separately from the nitrogen. According to any preferred embodiment, the system (at the station and the vehicle) may be configured to adapt the conditions of storage/dispensing and use (e.g. pressure, temperature, flow rates, etc.) depending upon the composition of the ballast fluid.

Figure 13A:
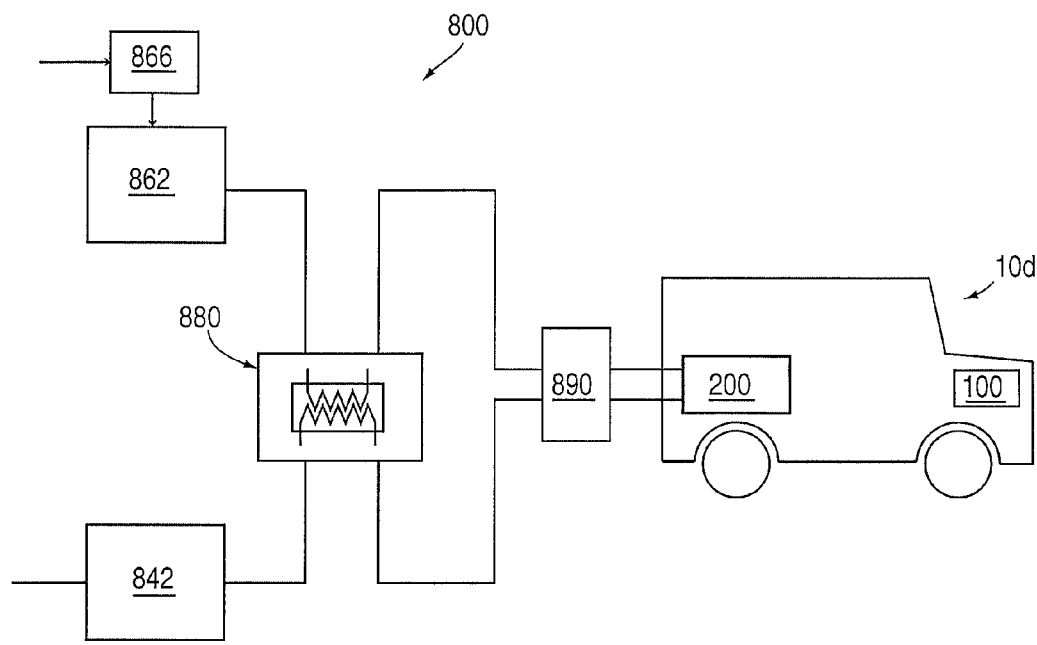
FIGS. 13A through 14 are schematic diagrams showing the operation of a system for refueling a vehicle with a storage system for fuel and ballast fluid.
Figure 13B:
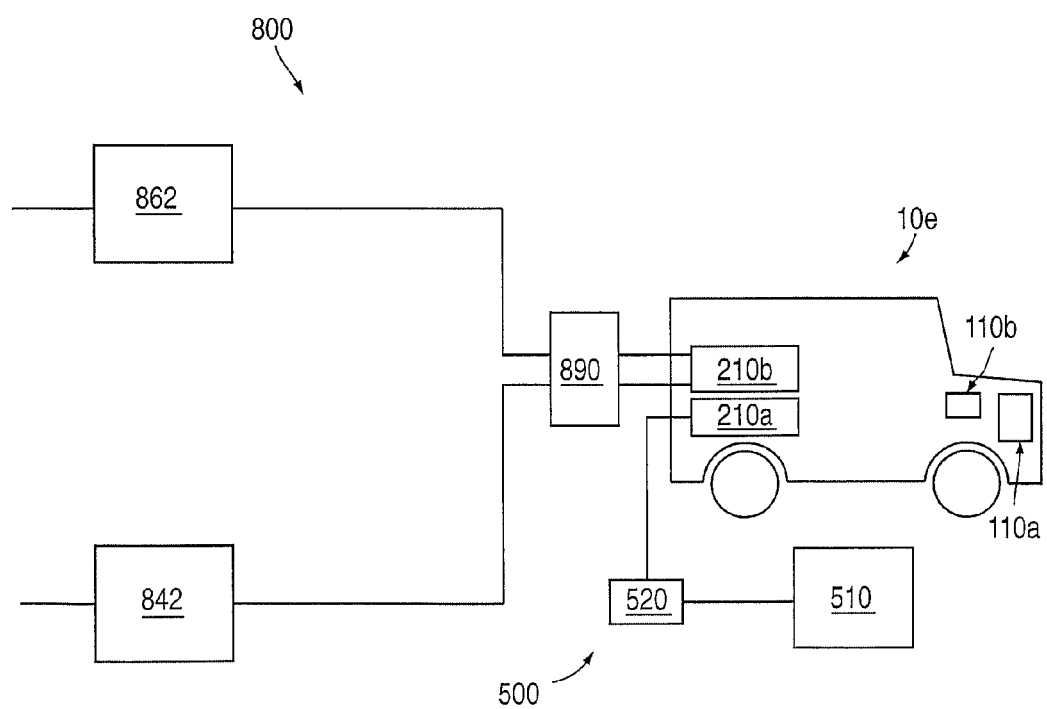
Figure 14:
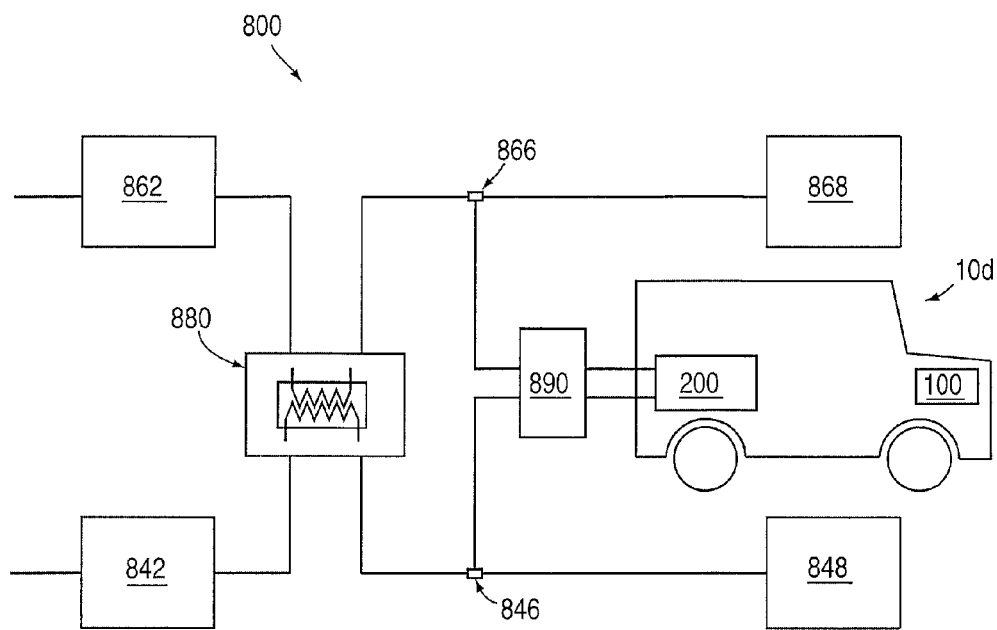

FIGS. 13A through 14 are schematic diagrams showing the operation of a system for refueling a vehicle with a storage system for fuel and ballast fluid. As shown in FIG. 13A, system 800 comprises an interface 890 for conditioning, metering and supplying fuel to storage system 200 of vehicle 10. System 800 also comprises a system 866 to obtain ballast fluid; for example, a compressor and pressure swing adsorption separation system from which ballast fluid such as nitrogen or oxygen or a combination of nitrogen and oxygen can be obtained from purified and compressed ambient atmospheric air (see also FIG. 9). As shown in FIG. 13B, system 800 comprises a filling or refueling station for a hybrid or dual-fuel vehicle 10e; a system 500 comprises a source 510 of fuel or energy and an interface 520 for connection to a storage system 210a of vehicle 10e. Source 510 may provide fuel such as gasoline or diesel fuel or another type of fuel suitable for the vehicle at storage system 210a for use in power plant 110a. If vehicle 10e is a hybrid electric vehicle, storage system 210a will comprise a battery system; source 510 will provide electric current to recharge storage system 210a. As indicated in FIG. 12A, fuel will be provided to storage system 210b from system 800 through interface 890 (e.g. which comprises a tap with connection to the storage system of the vehicle to be refueled).

Referring to FIG. 14, system 800 for refueling a vehicle may also comprise supplemental separate tanks for fuel (fuel tank 848) and for the ballast fluid (ballast fluid tank 868). As indicated, the separate tanks may be auxiliary to system 800 (e.g. optional or external). As shown in FIG. 14, the separate tanks may be integrated with system 800; flow and conditioning of the fuel may be regulated and controlled by a regulation system 846; flow and conditioning of the ballast fluid may be regulated and controlled by a regulation system 866. Each regulation system will comprise a control system as well as related instrumentation.

Figure 15:
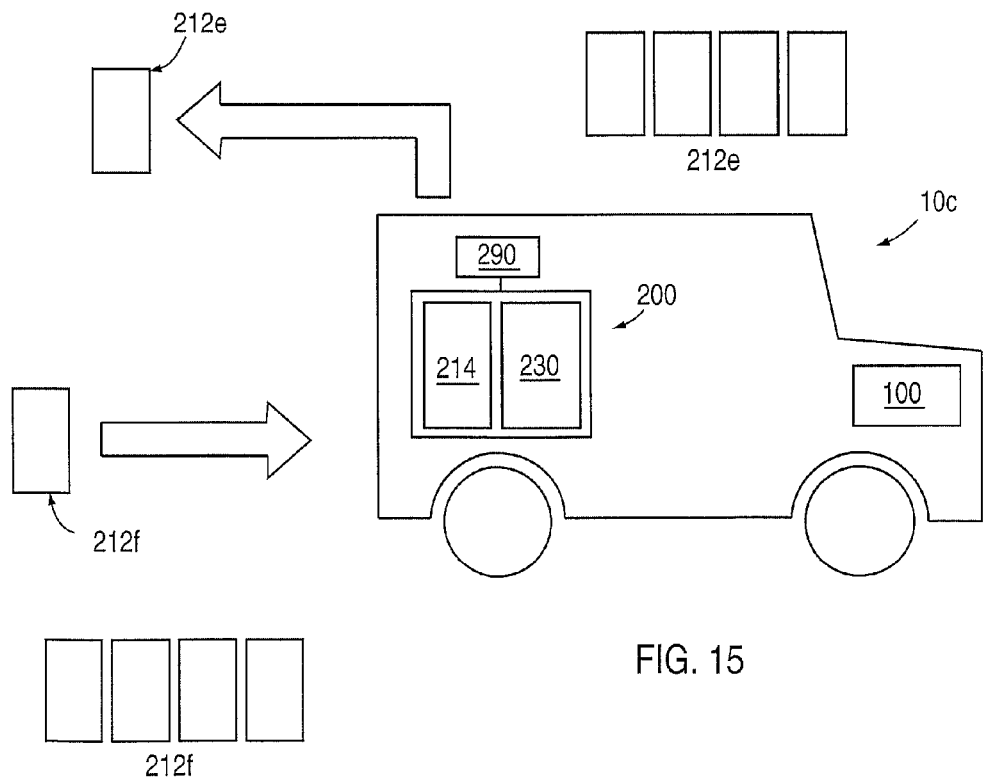
FIG. 15 is a schematic diagram of a system for replacing fuel in a vehicle with a storage system for fuel and ballast fluid.

FIG. 15 is a schematic diagram of a system for replacing fuel in a vehicle with a storage system for fuel and ballast fluid. As shown schematically in FIG. 15, storage system 200 of vehicle 10c comprises a receptacle 214 for a removable tank 212; at the filling or refueling station, an empty or expended tank 212e (substantially depleted of fuel or ballast fluid) can be removed and replaced with a full tank 212f (substantially full of fuel or ballast fluid). The station may maintain a stock of full tanks 212f which will be purchased by customers and returned/exchanged with empty tanks 212e as needed.

Figure 16:
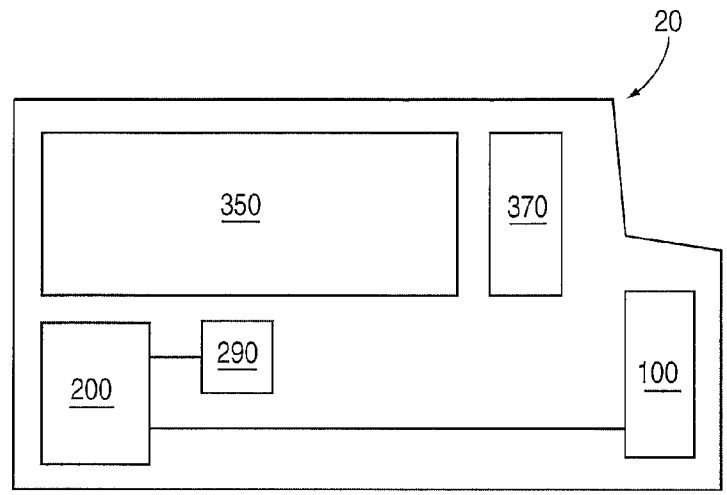
FIG. 16 is a schematic block diagram of a facility or vehicle having a storage system for fuel and ballast fluid.

FIG. 16 is a schematic block diagram of a facility/installation or vehicle comprising a storage system for fuel and ballast fluid. As shown schematically in FIG. 16, an installation 20 is intended to be generally representative of any type of installation/facility or vehicle. Installation 20 comprises a storage system 200 for fuel and ballast fluid and a power plant 100. The installation/facility may comprise a building, storage location, plant, residence (single-unit home or multi-unit residential facility), office building, commercial building, trailer, utility building, etc. The installation/vehicle may comprise an automobile, passenger vehicle, commercial vehicle, work vehicle, recreational vehicle, airplane, train, boat, bus, truck, tractor, etc. Installation 20 comprises a space 350 for persons (e.g. passengers, visitors, occupants, workers, residents, etc.) or for cargo or storage as well as a control/interface system 370. As shown, the storage system for fuel and ballast fluid may be installed in any type of facility or vehicle.

Figure 17:
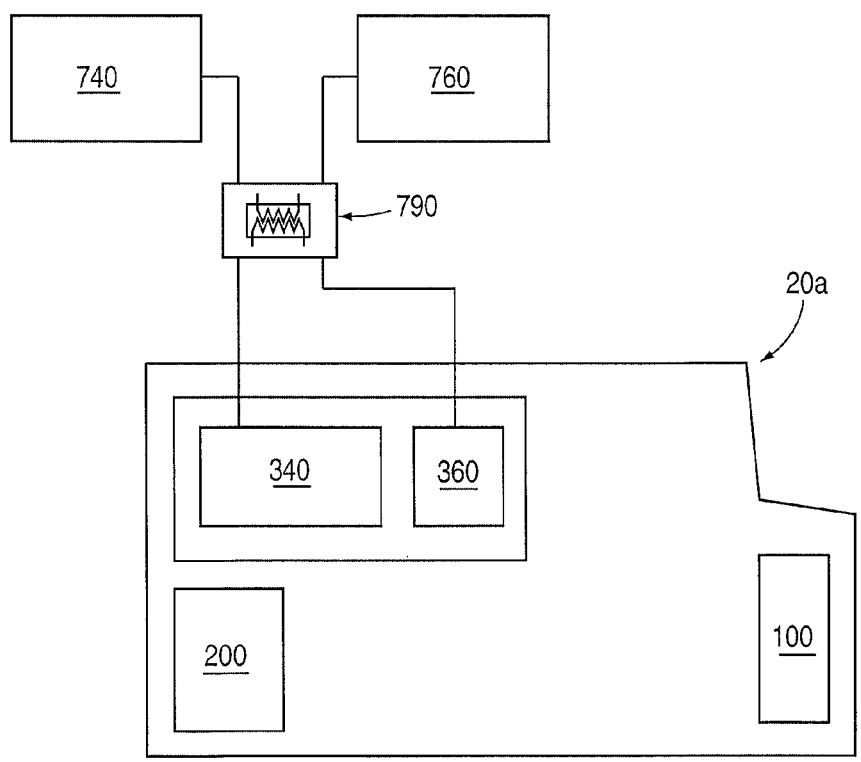
FIG. 17 is a schematic block diagram of a facility or vehicle having a storage system for fuel and ballast fluid and a terminal for loading or unloading fuel and ballast fluid.

FIG. 17 is a schematic block diagram of a facility or vehicle (such as a tanker, tank truck, train or ship) having a storage system for fuel and ballast fluid and a terminal for loading or unloading fuel and ballast fluid. According to an exemplary embodiment, vehicle 20a comprises a transport vessel for fuel and ballast fluid (e.g. tanker truck, train with tanker railcar, marine tank ship or tanker, etc.); fuel and ballast fluid may be loaded or unloaded/offloaded from the vehicle through an interface 790; fuel may be loaded or unloaded between chamber 740 and chamber 340 on vehicle 20a; ballast fluid may be loaded or unloaded between chamber 760 and chamber 360 on vehicle 20a. As shown, vehicle 20a also comprises a power plant 100 that uses fuel and a storage system 200 for fuel and ballast fluid (e.g. for propulsion). See also FIG. 16.

Figure 18:
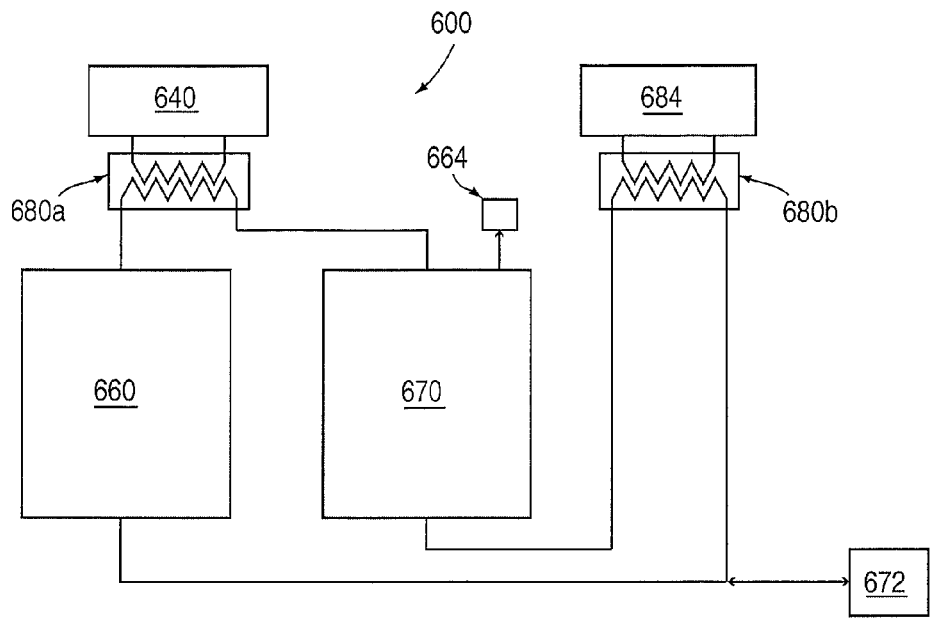
FIG. 18 is a system for recovering and reusing ballast fluid in a storage system for fuel and ballast fluid.

FIG. 18 shows a system 600 for recovering and reusing ballast fluid in a storage system for fuel and ballast fluid. Ballast fluid in a vapor phase after having passed through a heat transfer system 680a to cool/condense fuel into a liquid phase is contained in a chamber 670; the vapor ballast fluid may be used to perform mechanical work for a system in the vehicle or facility (e.g. using a turbomachine) by coupling to a tap or interface 664; the vapor ballast fluid may be supplied to a heat transfer system 680b (such as a heat pump) for use in a system in the vehicle or facility/installation. Additional ballast fluid may be provided from a reserve tank 672. Ballast fluid is conditioned and converted from vapor phase to liquid phase (e.g. through a heat transfer system using dispensed fuel as the refrigerant and heat transfer medium) and stored in a chamber 660. Ballast fluid in liquid phase is then available to cool and condense (at system 640) fuel in the vapor phase into fuel in the liquid phase by heat transfer system 680a. According to other exemplary embodiments, the fuel and/or the ballast fluid may be used for heat exchange for other vehicle systems, for example, ballast fuel may be used in a heat transfer system 680b as a refrigerant in a system 684 for the vehicle; system 684 may be configured to air condition the passenger compartment or a storage area of the vehicle (e.g. for a vehicle configured to transport refrigerated foods). Pressurized ballast fluid that otherwise may be vented to the atmosphere may be available to perform work in other vehicle systems.

Figure 19A:
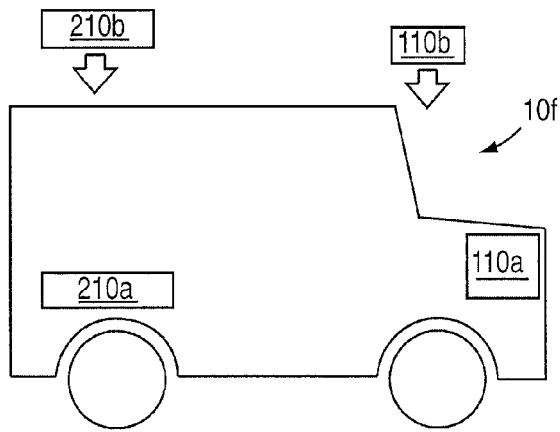
FIGS. 19A and 19B are schematic diagrams of a retrofit installation of a storage system for fuel and ballast fluid in a vehicle.
Figure 19B:
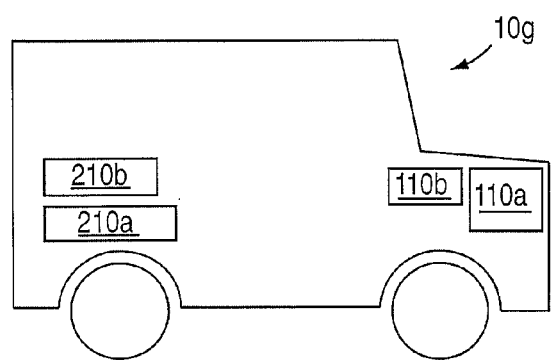

FIGS. 19A and 19B are schematic diagrams of an installation of a storage system for fuel and ballast fluid in a vehicle. As shown in FIG. 19A, vehicle 10 includes a power plant 110a and a corresponding fuel/energy storage system 210a; for example, if the vehicle is an electric vehicle and the power plant comprises an electric motor system, the energy storage system will comprise a battery system; if the vehicle is a conventional automobile and the power plant comprises a gasoline-powered engine, the fuel storage system will comprise a gasoline tank. As shown in FIG. 19B, vehicle 10 has had installed a power plant (and/or power plant modification) 110b and a storage system 210b to provide fuel; for example, if the vehicle is an electric vehicle and the additional installed power plant comprises an engine powered by a fuel such as natural gas, the additional installed storage system would be configured to provide natural gas to the engine (as shown in FIGS. 3 and 12B). According to an exemplary embodiment, as shown in FIGS. 19A and 19B, the installation of power plant (or power plant modification) 110b and storage system 210b may be by retrofit into an existing vehicle with existing power plant 110a and storage system 210a.

Figure 20A:
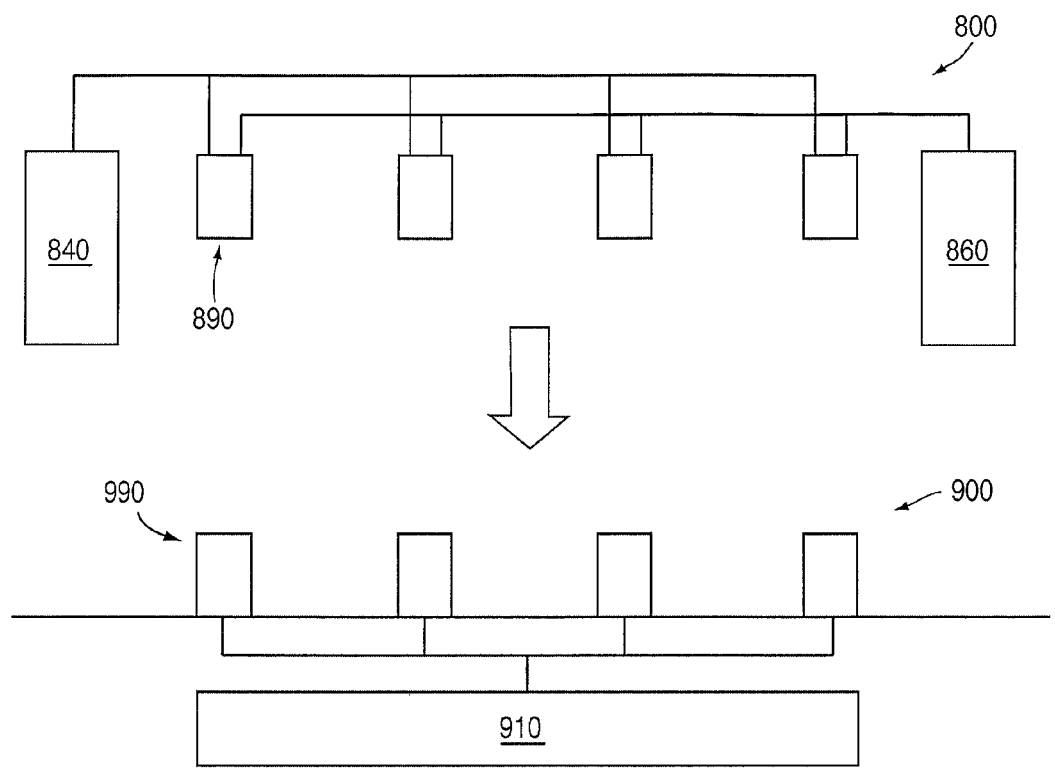
FIGS. 20A and 20B are schematic diagrams of a retrofit installation of a storage system for fuel and ballast fluid in a filling station.
Figure 20B:
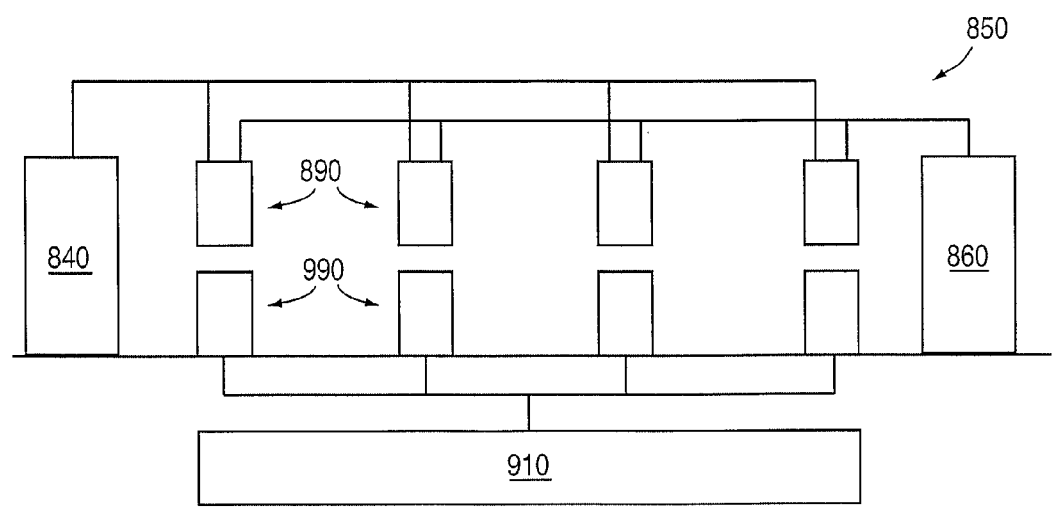

FIGS. 20A and 20B are schematic diagrams of an installation of a storage system for fuel and ballast fluid in a filling station or terminal. Referring to FIG. 20A a filling station 800 for dispensing a fuel to vehicles stored as a cryogenic liquid is shown. Filling station 800 comprises a system for storing and dispensing fuel and ballast fluid. Fuel is stored in a system 840 comprising a storage chamber and ballast fluid is stored in a system 860 comprising a storage chamber. According to a preferred embodiment, the fuel and ballast fluid are stored cryogenically as shown in FIGS. 5, 7A-7B. Fuel is dispensed to a vehicle through an interface 890; ballast fluid may be received from a vehicle (or dispensed to a vehicle) through interface 890. The filling station is configured for vehicles having a storage system as shown in FIG. 1, 3 or 4, for example. According to an exemplary embodiment (as shown), the filling station will be provided with a series of interfaces that allow multiple vehicles to be refueled simultaneously. Interface 890 comprises metering and monitoring system as well as a system for determining the price to be charged for the fuel and/or ballast fluid dispensed to each vehicle (e.g. in a commercial or retail transaction).

A filling station 900 for dispensing to vehicles a fuel or energy source is also shown in FIG. 20A. Filling station 900 comprises a storage system 910 for fuel or energy, for example, of a type configured as a conventional "gas station" according to an exemplary embodiment. Fuel or energy is dispensed to a vehicle through an interface 990. The fuel may be any type of fuel that can be used by a vehicle, such as gasoline, diesel fuel, natural gas, etc.; the energy source may be a source of electrical current such as a battery pack or generator-alternator (e.g. for an electric vehicle or hybrid-electric vehicle). According to an exemplary embodiment, Interface 990 comprises metering and monitoring system as well as a system for determining the price to be charged for the fuel and/or ballast fluid dispensed to each vehicle.

According to a particularly preferred embodiment, each interface 890 and interface 990 will comprise a monitoring/metering system and data interchange system for a commercial transaction with a customer who is refueling a vehicle (e.g. similar to a conventional point of sale terminal provided at a retail gasoline outlet, allowing payment/billing through a credit card, debit card, account number, payment by cash, etc.); the customer would be charged for the amount of fuel and/or ballast fluid dispensed as determined at the interface. If the customer returns ballast fluid to the filling station, the customer may receive a credit (e.g. in an amount determined by the amount of ballast fluid returned and the designated per-unit price of the ballast fluid at the station) to be applied toward the transaction or may receive payment directly or to an account. The station may also be configured to allow a customer to return fuel (e.g. for credit or payment). (The station may be configured with and interface having a suitable monitoring and filtration system for fuel or ballast fluid returned by a customer.) According to other exemplary embodiments, the customer accruing the fuel charge (or ballast fluid credit) may be the operator of the vehicle, a passenger in the vehicle, or may be the owner, manager, renter or lessee of the vehicle (or otherwise may have a relationship to the vehicle or owner/operator of the vehicle).

Referring to FIG. 20B, the retrofit or combined/co-located installation of a filling station 850 is shown schematically. Station 850 comprises station 800 for fuel and a ballast fluid used in a storage system for vehicles as shown in FIGS. 1 and 4 (for example) and a station 900 for a vehicle having (independently or additionally) a storage system for another type of fuel or energy (e.g. as shown in FIG. 3 or 12B). Combined filling station 850 is configured to allow customers to dispense (e.g. in a retail/point of sale transaction) any or each type of fuel available to be dispensed for use by the vehicle (e.g. natural gas and gasoline, natural gas and diesel fuel, biofuels such as ethanol or butanol and natural gas, etc.) or a combination of fuel and energy for use by the vehicle (e.g. natural gas and electric current to charge a battery system); the filling station is also configured to dispense ballast fluid to the vehicle (if needed), to recover ballast fluid from the vehicle (if possible) or to vent ballast fluid (if appropriate). According to any alternative embodiment, the filling station is configured to dispense multiple types of fuel and energy through a suitable interface to the storage system of a vehicle for a commercial transaction that is convenient for a customer (e.g. retail sale). The station or stations for refilling/refueling may be connected by a network and system that allows monitoring of demand and usage of fuel and ballast fluid by customers.

Natural gas is presently in abundant supply and available as a cost-competitive fuel for vehicles; nitrogen is also readily available from the atmosphere and inert (safe to vent to the atmosphere). According to an exemplary embodiment he system for storing and dispensing fuel and ballast fluid as shown in the FIGURES will operate essentially as a "rechargeable" system (e.g. like a rechargeable battery), allowing the vehicle to be "charged" with liquid natural gas at commissioning when put into service and then "recharged" by refueling as needed during subsequent use. The system may be provided in hybrid vehicles that operate as dual-fuel systems (e.g. natural gas and gasoline) or with dual motive power systems (e.g. natural gas and electric/battery power); such vehicles may be configured for regional use and optimized for fuel and/or energy availability in a particular location or region.

According to an alternative embodiment, the station may be provided with temporary storage for fuel (e.g. a large capacity tank) so that fuel can be obtained from the source (e.g. a commercial source of supply, for example a utility company) and stored in the temporary storage when fuel is available at a lower cost (e.g. when rates are below a threshold amount). Fuel may be stored in temporary storage in vapor phase (e.g. in the form obtained from the source, ambient pressure or compressed) and refrigerated to liquid phase for storage when surplus refrigerant is available or in a time or on a day when the cost of refrigeration is lower. For example, fuel can be purchased from the source and stored in temporary storage when the cost of fuel from the source is below a predetermined cost; fuel from temporary storage will be available to be converted from vapor phase to liquid phase and/or for use. The fuel from temporary storage may be converted to liquid phase when surplus or additional ballast fluid is available or when the cost of operation of a refrigeration system (e.g. heat transfer system) is reduced (e.g. when energy rates are reduced).

According to an alternative embodiment, the system may have multiple modes of operation (e.g. multiple speeds of operation) for refrigerating the fuel and/or ballast fluid in the heat transfer system. The system may operate in a first mode where ballast fluid is supplied to the heat transfer system at a first flow rate (e.g. the typical or normal flow rate/flow speed) and a second mode where ballast fluid is supplied to the heat transfer system at a second flow rate (e.g. a faster flow rate/flow speed); with the second flow rate higher than the first flow rate, fuel is refrigerated more quickly in the second mode than in the first mode. A supplemental supply of ballast fluid used as refrigerant may be provided (e.g. in a supplemental tank) for use when the system is operating in the second mode (e.g. at higher speed). The supplemental supply of ballast fluid (e.g. in liquid phase) can be used in the heat transfer system when needed to refrigerate the fuel.

* * *

It is important to note that the construction and arrangement of the elements of the present inventions as described in embodiments of the system and method and as shown in the FIGURES is illustrative only. Although some embodiments of the present inventions have been described in detail in this disclosure, those skilled in the art who review this disclosure will readily appreciate that many modifications are possible without materially departing from the novel teachings and advantages of the subject matter of the present inventions as recited. Accordingly, all such modifications are intended to be included within the scope of the present inventions. Other substitutions, modifications, changes and omissions may be made in the design and configuration of components, variations in the arrangement or sequence of process/method steps, operating conditions and arrangement of the preferred and other exemplary embodiments without departing from the spirit of the present inventions.

It is important to note that the system and method of the present inventions can comprise conventional technology or any other applicable technology (present or future) that has the capability to perform the functions and processes/operations indicated in the specification including FIGURES. All such technology is considered to be within the scope of the present inventions.

The invention claimed is:

1. A system for storing and dispensing a fuel and a ballast fluid comprising:
a chamber for storing the fuel;
a chamber for storing the ballast fluid; and a heat transfer system including a first heat exchanger, disposed exterior the fuel chamber and exterior the ballast fluid chamber, between the fuel chamber and a fuel outlet and between the ballast fluid chamber and a ballast fluid inlet so that fuel exterior the fuel chamber is used as a refrigerant for ballast fluid exterior the ballast fluid chamber wherein (a) fuel, exterior the fuel chamber, dispensed from the fuel chamber is used exterior the fuel chamber as a refrigerant for ballast fluid, exterior the ballast fluid chamber, received for storage in the ballast fluid chamber and (b) ballast fluid, exterior the ballast fluid chamber and exterior the fuel chamber, dispensed from the ballast fluid chamber is used as a refrigerant exterior the fuel chamber for fuel, exterior the fuel chamber, received for storage in the fuel chamber.

2. The system of claim 1 wherein the ballast fluid and fuel are stored at different temperatures.

3. The system of claim 1 wherein the ballast fluid and the fuel are each stored at a different pressure chosen to equalize approximately the boiling point of the fuel and the boiling point of the ballast fluid.

4. The system of claim 1 wherein either the ballast chamber or the fuel chamber is configured for direct input to allow addition or direct output to allow removal of refrigerated fluid.

5. The system of claim 1 wherein the fuel is refrigerated is by direct cooling.

6. The system of claim 1 wherein the fuel is stored in the fuel chamber substantially in liquid phase and the ballast fluid is stored in the ballast fluid chamber substantially in liquid phase.

7. The system of claim 1 wherein the fuel is heated and evaporated from liquid phase to vapor phase in the heat transfer system.

8. The system of claim 1 wherein the ballast fluid is cooled and condensed from vapor phase to liquid phase in the heat transfer system.

9. The system of claim 1 wherein the ballast fluid is heated and evaporated from liquid phase to vapor phase in the heat transfer system.

10. The system of claim 1 wherein the fuel is cooled and condensed from vapor phase to liquid phase in the heat transfer system.

11. The system of claim 1 further comprising: an inlet for receiving the fuel; an outlet for dispensing the fuel; an inlet for receiving the ballast fluid; and an outlet for dispensing the ballast fluid.

12. The system of claim 1 wherein the fuel chamber is within a tank.

13. The system of claim 1 wherein the ballast fluid chamber is within a tank.

14. The system of claim 12 wherein the ballast fluid chamber is within the tank.

15. The system of claim 14 wherein the tank provides a volume and the fuel and the ballast fluid shares the volume.

16. The system of claim 1 wherein the ballast fluid chamber comprises a bladder.

17. The system of claim 1 wherein the fuel chamber comprises a bladder.

18. The system of claim 1 wherein fuel is dispensed from the fuel chamber as ballast fluid is supplied to the ballast fluid chamber so that the ballast fluid volume is expanded as the fuel volume is reduced.

19. The system of claim 1 wherein the heat transfer system comprises a heat exchanger.

20. The system of claim 1 wherein the heat transfer system comprises a first heat exchanger and a second heat exchanger.

21. The system of claim 1 wherein the heat transfer system comprises at least one microchannel heat exchanger.

22. The system of claim 1 wherein the heat transfer system comprises a counterflow heat exchanger.

23. The system of claim 1 further comprising a reserve chamber for storage of the ballast fluid coupled to the ballast fluid chamber.

24. The system of claim 1 wherein the heat transfer system comprises a heat pump.

25. The system of claim 1 installed in a vehicle.

26. The system of claim 1 installed in a station.

27. The system of claim 25 wherein the vehicle comprises one of a passenger vehicle, a work vehicle, a cargo transport, a tanker transport, a car, a bus, a truck, a hybrid vehicle, a dual-fuel vehicle, a hybrid-electric vehicle, a train, a rail transport vehicle, a locomotive, a railroad vehicle, a plane, a marine transport vehicle, a ship, a boat, a cargo vessel, a passenger ship.

28. The system of claim 1 wherein the fuel comprises natural gas.

29. The system of claim 1 wherein the fuel comprises methane.

30. The system of claim 1 wherein the fuel comprises a combustible fluid.

31. The system of claim 1 wherein the ballast fluid comprises a fluid obtainable from atmospheric air.

32. The system of claim 1 wherein the ballast fluid comprises a fluid obtainable from air at ambient conditions.

33. The system of claim 1 wherein the ballast fluid comprises air.

34. The system of claim 1 wherein the ballast fluid comprises a fluid obtained by conditioning atmospheric air obtained at ambient conditions.

35. The system of claim 1 wherein the ballast fluid comprises an inert fluid.

36. The system of claim 1 wherein the ballast fluid comprises nitrogen.

37. The system of claim 1 wherein the ballast fluid comprises oxygen.

38. The system of claim 1 wherein the ballast fluid comprises nitrogen and oxygen.

39. The system of claim 1 wherein the ballast fluid comprises nitrogen and oxygen in a predetermined ratio.

40. The system of claim 1 further comprising a system to separate air into nitrogen and oxygen and to supply oxygen for combustion with the fuel.

41. The system of claim 1 wherein the fuel is stored at a cryogenic temperature.

42. The system of claim 1 wherein the ballast fluid is stored at a cryogenic temperature.

43. The system of claim 1 further comprising a system to condition the fuel for storage.

44. The system of claim 1 further comprising a system to condition the ballast fluid for storage.

45. The system of claim 1 wherein the ballast fluid is a cryogenically-liquified fluid conditioned by pressurization.

46. The system of claim 1 wherein the fuel is a cryogenically-liquified fluid conditioned by pressurization.

47. The system of claim 1 configured to alternatively store and dispense fuel and ballast fluid in a compensatory arrangement so that as fuel is dispensed ballast fluid is stored and as fuel is stored ballast fluid is dispensed.

* * * * *